(12) United States Patent
Sato

(10) Patent No.: US 6,825,858 B2
(45) Date of Patent: Nov. 30, 2004

(54) SELECTION METHOD OF DEVICES CONNECTED WITH ELECTRONIC EQUIPMENT AND ELECTRONIC EQUIPMENT REALIZING SUCH SELECTION METHOD

(75) Inventor: Masahiko Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 691 days.

(21) Appl. No.: 09/756,435

(22) Filed: Jan. 8, 2001

(65) Prior Publication Data
US 2001/0052946 A1 Dec. 20, 2001

(30) Foreign Application Priority Data

Jan. 11, 2000 (JP) ...................................... P2000-002826
Nov. 28, 2000 (JP) ...................................... P2000-360805

(51) Int. Cl.[7] .............................. G06F 3/14; H04N 5/44
(52) U.S. Cl. ...................... 345/735; 345/771; 345/835; 345/840; 348/705; 348/552
(58) Field of Search ................................ 345/735, 771, 345/810, 835, 965, 970, 734, 825, 736, 773, 821, 822, 823, 824, 839, 840, 440; 348/552, 553, 554, 555, 563, 569, 705, 706; 700/83, 85

(56) References Cited

U.S. PATENT DOCUMENTS

| | | | | | |
|---|---|---|---|---|---|
| 4,996,597 A | * | 2/1991 | Duffield | ....................... | 348/705 |
| 5,452,415 A | * | 9/1995 | Hotka | ......................... | 345/735 |
| 5,579,221 A | * | 11/1996 | Mun | ............................ | 700/83 |
| 6,040,874 A | * | 3/2000 | Kim | ........................... | 348/569 |
| 6,177,963 B1 | * | 1/2001 | Foye et al. | ................. | 348/706 |
| 6,593,941 B1 | * | 7/2003 | Sameshima | ............. | 345/719 X |

* cited by examiner

Primary Examiner—Raymond J. Bayerl
(74) Attorney, Agent, or Firm—Oblon, Spivak, McClelland, Maier & Neustadt, P.C.

(57) ABSTRACT

A plurality of input/output terminals, with which devices having different protocols are connected in physically different forms, are displayed in an ordinate axis direction, and some of the devices, which are connected with the input/output terminals and the connection states of which can logically be discriminated, are displayed in an abscissa axis direction. The devices are selected by the selection of the input/output terminals displayed in the ordinate axis direction, or by the selection of the devices displayed in the abscissa axis direction, or by the selection of the devices displayed in the abscissa axis direction after the selection of the input/output terminals displayed in the ordinate axis direction.

54 Claims, 27 Drawing Sheets

SELECTION METHOD OF DEVICES CONNECTED WITH ELECTRONIC EQUIPMENT AND ELECTRONIC EQUIPMENT REALIZING SUCH SELECTION METHOD

BACKGROUND OF THE INVENTION

1. Field of the Invention

The present invention relates to a selection method of devices connected with a piece of electronic equipment and electronic equipment realizing the selection method. In particular, the present invention relates to a selection method of devices connected with a piece of electronic equipment and electronic equipment realizing the selection method, in which a plurality of input/output terminals and devices connected with the input/output terminals are displayed in ordinate axis directions and abscissa axis directions so as to be easily selected, and in which a selected device is set as an inputting device or an outputting device, or the inputting device and the outputting device that are connected with each other.

2. Description of the Related Art

Prior art electronic equipment having a plurality of input/output terminals to be connected with devices, for example, a television receiver 10 includes, as shown in FIG. 25, input/output terminals Line-1, Line-2 to be connected with devices for analog signals and an input/output terminal to be connected with a digital bus 13 conforming to the Institute of Electronical and Electronics Engineers (IEEE) Standards 1394. In the configuration, a first device 11 is connected with the input/output terminal Line-1; a second device 12 is connected with the input/output terminal Line-2; daisy-chained devices, Device-1, Device-2 and Device-3, are connected with the input/output terminal for the digital bus 13, to which a third device 14 is connected as the Device-1; a fourth device 15 is connected as the Device-2; and a fifth device 16 is connected as the Device-3. Among the devices 11, 12, 14–16 connected with the input/output terminals in the aforesaid manner, a user can select a desired device in a menu displayed in a superimposed way (On Screen Display: OSD).

To adduce a specific example of the configuration, as shown in FIG. 26, a video tape recorder (VTR) is connected with the input/output terminal Line-1 of the television receiver 10 as the first device 11; a laser disk player (LDP) is connected with the input/output terminal Line-2 as the second device 12; a video cassette recorder (VCR) is connected with the digital bus 13 as the third device 14, the Device-1; a hard disc drive (HDD) is connected with the digital bus 13 as the fourth device 15, the Device-2; and a digital video disc player, or a digital versatile disc player, (DVD) is connected with the digital bus 13 as the fifth device 16, the Device-3.

With the television receiver 10 having the aforesaid connection configuration, as shown in FIG. 27, the devices can appropriately be selected in a state of being displayed on a screen 17 as graphic items by means of superimposing. In the present specification, the term "graphic item" means an image of a button-like icon displayed on the screen, which is used to select a device. The input/output terminals Line-1, Line-2 and the devices 14–16 (VCR, HDD, DVD) connected with the digital bus 13 are displayed on the screen 17 as the graphic items 19a–19e that are displayed in the menu 18 on the screen 17 in a row in an ordinate axis direction, for example, in the order of Line-1 (19a), Line-2 (19b), VCR (19c), HDD (19d), and DVD (19e) downward from the top. When a desired graphic item is selected among the graphic items 19a–19e displayed in the ordinate axis direction by a user's action of pointing it with a cursor, the contents of the selected device among the devices 11, 12, 14–16 are connected with the television receiver 10 to become possible of being input or output.

However, in the aforesaid prior art television receiver 10 equipped with the plurality of input/output terminals, when a user selects a device connected with the television receiver 10 for displaying it on the screen 17, the user can select the input/output terminals Line-1, Line-2 conventionally for analog signal inputs, but the user must select a device on the digital bus 13 for digital signal inputs because the devices 14–16 are connected in a daisy chain and the fact makes it impossible to select one of the devices 14–16 by selecting a physical line. In the case, the conventional method of the selection using a menu (e.g. menu shown in FIG. 27) is applicable for the selection. However, the method has a problem that it is impossible to judge which device is for analog signals and which device is for digital signals because icons of physical lines (Line-1, Line-2) and logical devices (VCR, HDD, DVD) are intermingled in the menu.

For example, input/output terminals to be connected with devices for analog signals can be displayed whether the devices are connected with the input/output terminals or not. However, the display regarding an input/output terminal to be connected with a digital bus connected with devices for digital signals automatically disappears from the screen when the daisy-chained devices are unchained and automatically appears in the screen when the devices are daisy-chained. Consequently, confusion arises in the judgment whether the devices in the current connection state are devices for analog signals or devices for digital signals.

There consequently is a problem to be resolved in the display method and the selection method for the easy discrimination of the connection state of devices to be connected with a plurality of input/output terminals of a piece of electronic equipment.

SUMMARY OF THE INVENTION

According to the present invention, the devices connected with a piece of electronic equipment are displayed in an ordinate axis direction and in an abscissa axis direction, and in the display of the devices, the devices that can be confirmed to be physically connected and the devices that can logically be identified are displayed in directions different from each other. Consequently, the discrimination of the connected devices, for example, the discrimination whether a device is for analog signals or for digital signals, becomes easy. Moreover, it becomes easy to select a device to which signals are output or devices to be connected with each other.

It is to be understood that both the foregoing general description of the invention and the following detailed description are exemplary, but are not restrictive, of the invention.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF THE PREFERRED EMBODIMENTS

Next, the attached drawings are referred while descriptions are given to embodiments of the selection method of devices connected with a piece of electronic equipment and the electronic equipment realizing the selection method according to the present invention. Incidentally, the same reference marks are given to the same constituents described in regard to the prior art.

Figure 25:
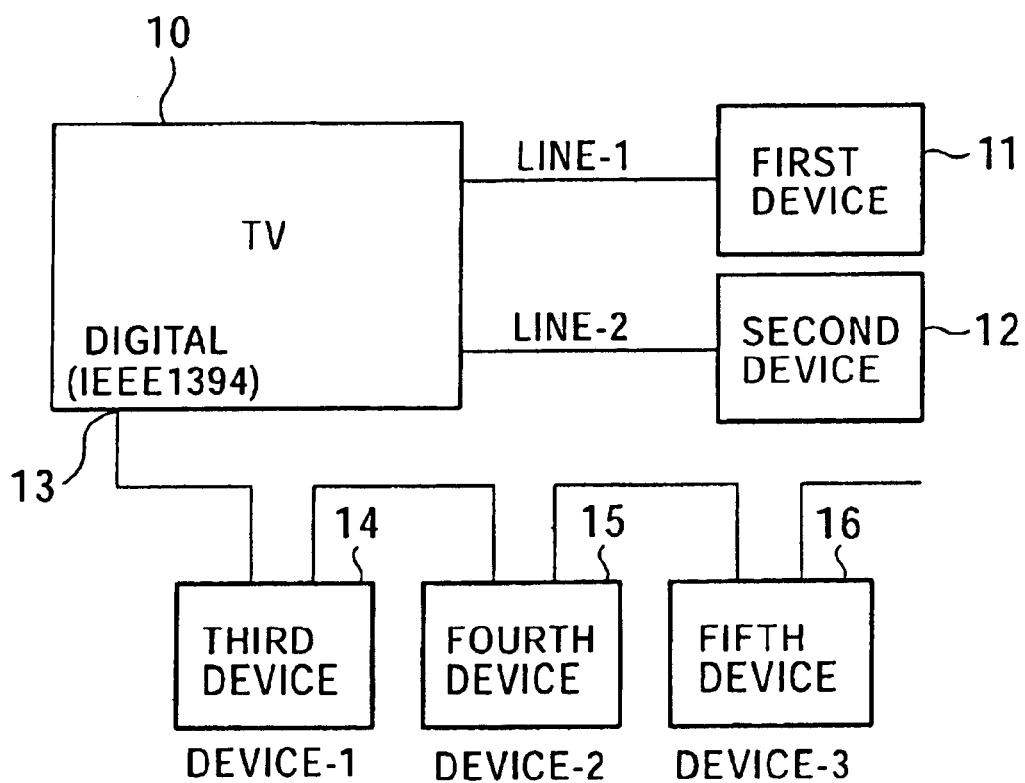
FIG. 25 is an explanatory view showing a prior art connection configuration of devices capable of being connected with a piece of electronic equipment (television receiver)
Figure 26:
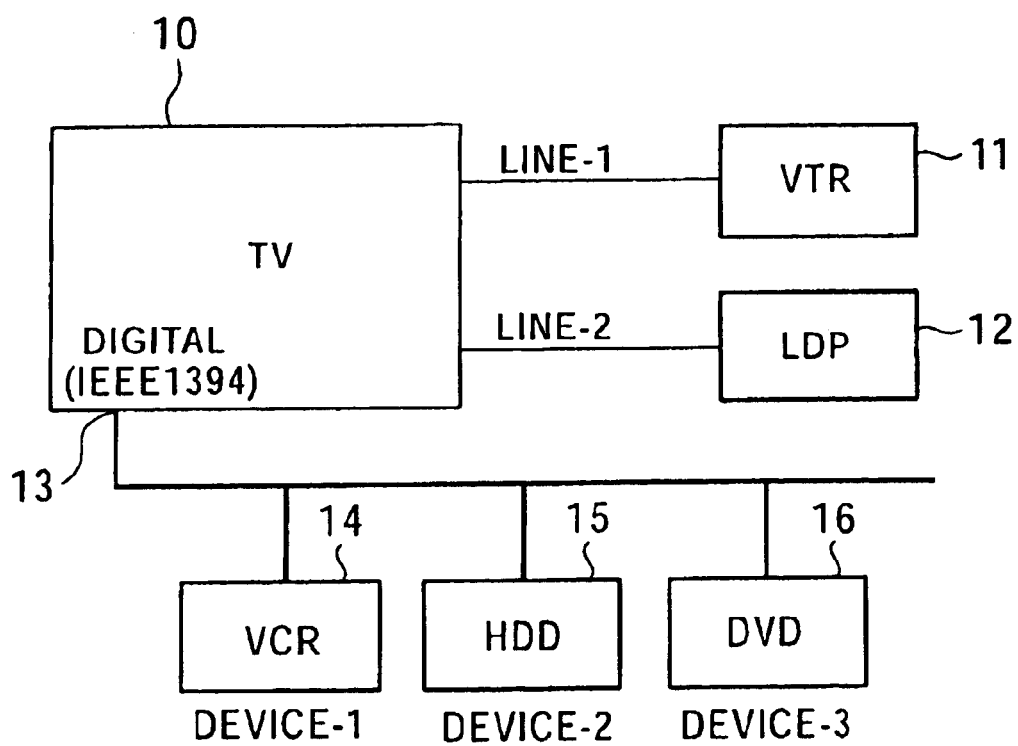
FIG. 26 is an explanatory view showing a prior art connection configuration of devices connected actually with a piece of electronic equipment.
Figure 27:
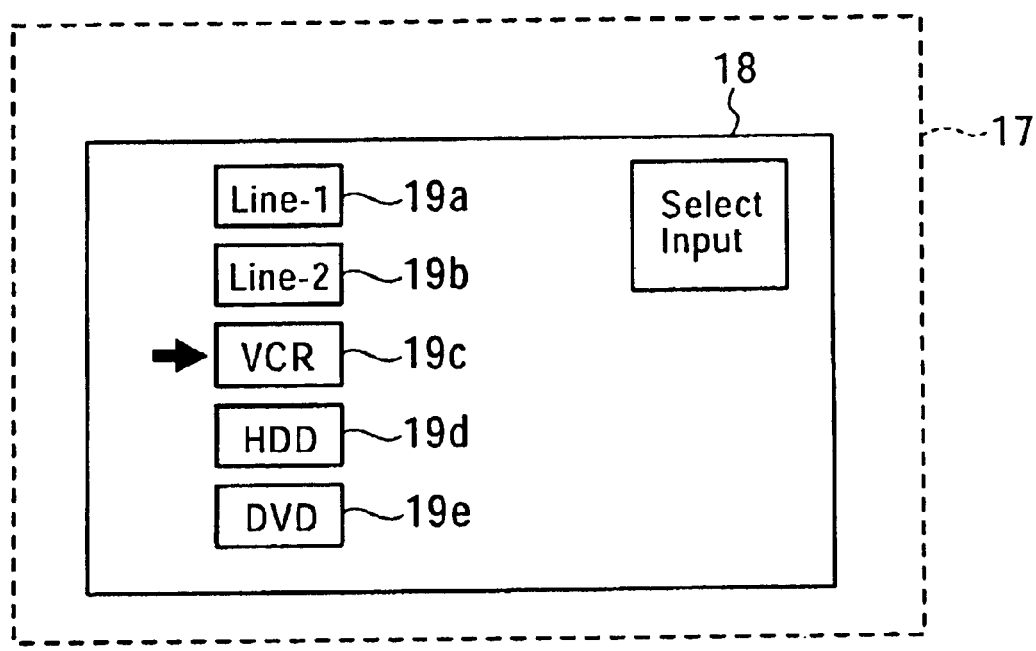
FIG. 27 is an explanatory view showing a prior art manner for the selection of devices connected with a piece of electronic equipment among their displays on a menu screen.

The configuration realizing the selection method of a first embodiment of the devices connected with a piece of electronic equipment of the present invention is the same as that of the prior art configuration shown in FIGS. 25 and 26. In the configuration, a television receiver 10 is the electronic equipment equipped with a plurality of input/output terminals. The input/output terminals are constituted of the following terminals to be connected with the following devices. That is, a first analog device (VTR) 11 is connected with an input/output terminal Line-1 to be connected with a device for analog signals; a second analog device (LDP) 12 is connected with an input/output terminal Line-2 to be connected with a device for analog signals; a first digital device (VCR) 14 as the daisy-chained Device-1 is connected with an input/output terminal connected with a digital bus 13 for digital signals conforming to the IEEE standard 1394; a second digital device (HDD) 15 as the Device-2 is connected with the digital bus 13; and a third digital device (DVD) 16 as the Device-3 is connected with the digital bus 13.

Figure 1:
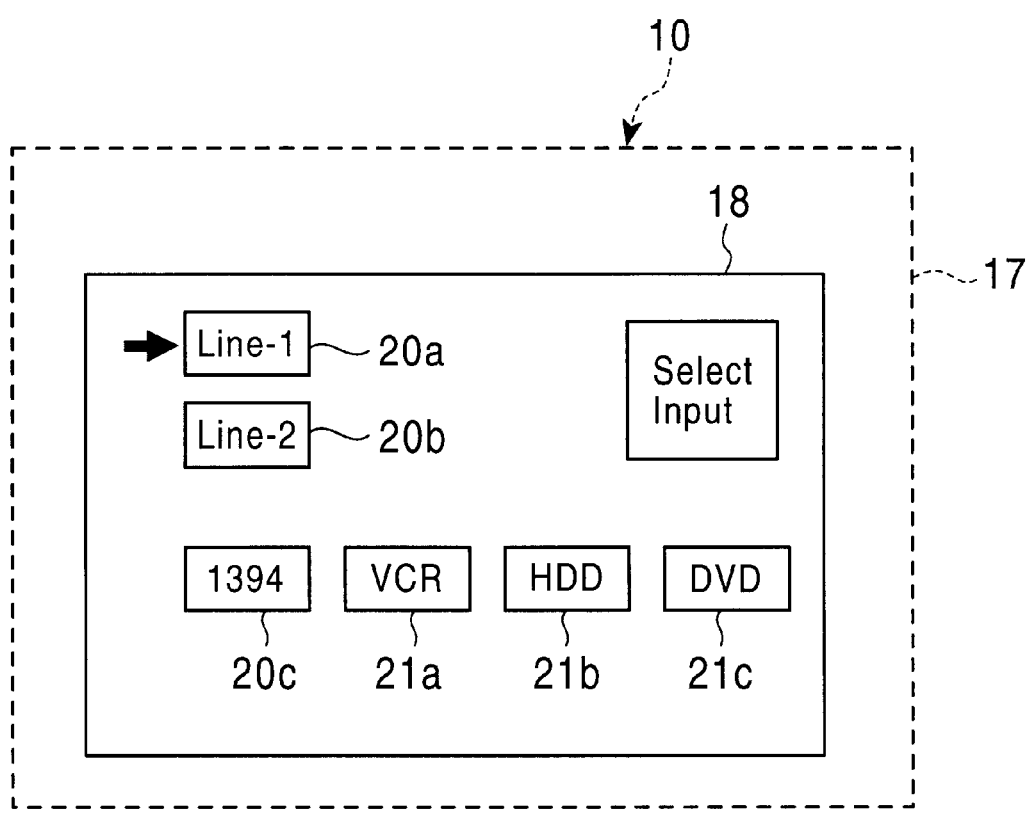
FIG. 1 is an explanatory view showing a menu screen in which devices capable of being physically connected are shown in an ordinate axis direction and devices capable of being logically discriminated are shown in an abscissa axis direction under the selection method of a first embodiment according to the present invention.

For selecting a device in the configuration of the television receiver 10, a user, first, selects a desired device among graphic items 20a–20c and 21a–21c representing the connected devices 11, 12, 14–16 and the digital bus 13 while observing a menu 18 displayed on a screen 17 of the television receiver 10 in a manner of superimposition as shown in FIG. 1. In the screen display of the menu 18, there are included the graphic items 20a–20c arranged in an ordinate axis direction, which are indicative of the devices 11, 12 and the digital bus 13 distinguishable physically, and the graphic items 21a–21c arranged in an abscissa axis direction, which are indicative of the digital devices 14–16 connected with the digital bus 13, and the connection state of which can logically be discriminated. The user selects one of the devices 11, 12, 14–16 by selecting any one of the graphic items 20a–20c and 21a–21c displayed in the ordinate axis direction and the abscissa axis direction, respectively. Incidentally, the input/output terminals Line-1, Line-2 to be connected with the devices for analog signals and the input/output terminal to be connected with the digital bus 13 are all treated as the physically connectable input/output terminals. The devices the connection state of which can logically be discriminated are the devices 14–16 connected with the digital bus 13 in a daisy chain state. In the present embodiment, the physically connectable devices 11, 12 and the digital bus 13 are represented by the graphic items Line-1 (20a), Line-2 (20b) and "1394" (20c) arranged in the ordinate axis direction. The VCR (21a) corresponding to the first digital device, the HDD (21b) corresponding to the second digital device, and the DVD (21c) corresponding to the third digital device are displayed as the logically discriminable devices 14–16 to be displayed in the abscissa axis direction.

Figure 2:
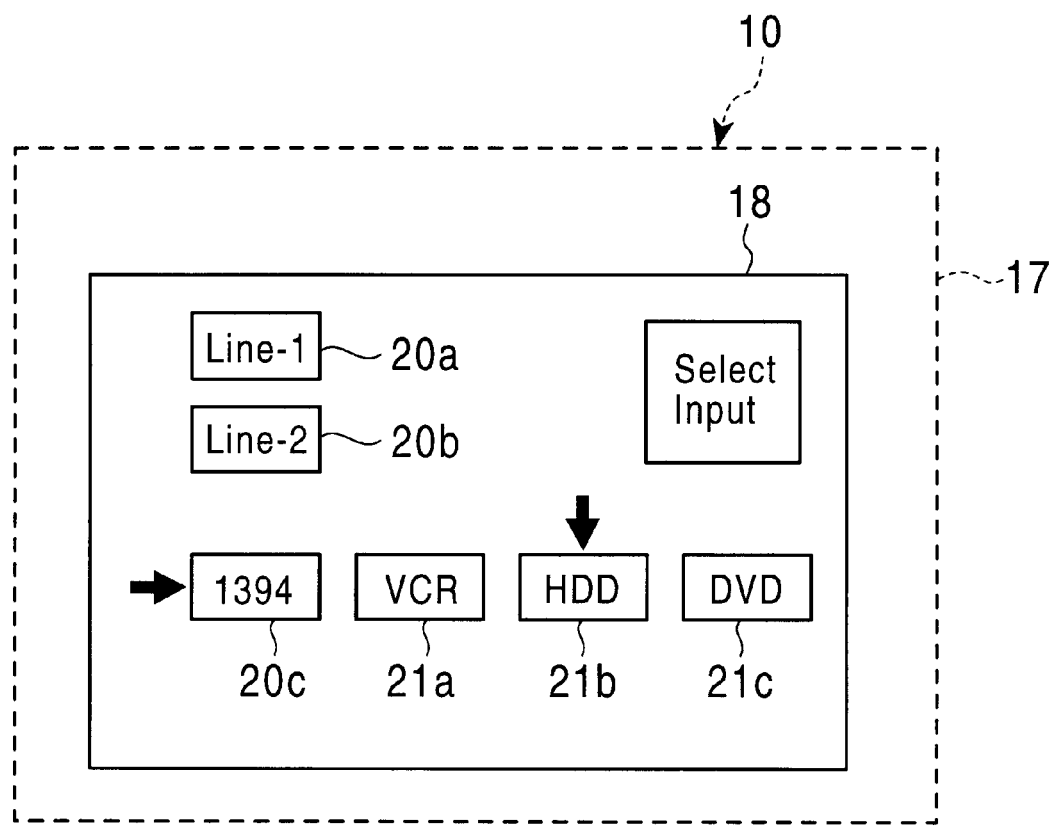
FIG. 2 is an explanatory view showing a technique for selecting and specifying a device in the menu shown in FIG. 1.

In the case where the devices 11, 12, 14–16 and the digital bus 13 are displayed as the graphic items 20a–20c and 21a–21c in the ordinate axis direction and in the abscissa axis direction, respectively, the user first selects one of the graphic items 20a–20c (that is, the devices 11, 12 and the digital bus 13) displayed in the ordinate axis direction. In the case of the embodiment shown in FIG. 1, the graphic item 20b (Line-2) indicated by the cursor is selected. In the case where the user selects one of the devices 14–16 (that is, the graphic items 21a–21c displayed in the abscissa axis direction), the user selects one of the graphic items 21a–21c displayed in the abscissa axis direction of the devices 14–16 as a desired device, the device "HDD" (21b) in the present embodiment, as shown in FIG. 2, and then the device HDD is directly selected. As the selection method of the devices 14–16, the graphic items 21a–21c of which are displayed in the abscissa axis direction, there is another method in addition to the method described immediately before in which one of the graphic items is directly selected. That is, it can be applicable that the user first selects the digital bus 13, the graphic item 20c of which is displayed in the ordinate axis direction, and then the user selects one of the devices 14–16, the graphic items 21a–21c of which are displayed in the abscissa axis direction. In the case of the embodiment shown in FIG. 2, the user selects the graphic item 20c ("1394") at first, and then the user selects the graphic item 21b ("HDD") in the abscissa axis direction. Incidentally, it is needless to say that the displaying state of the graphic item selected and decided with the cursor by the user may be displayed to be inverted or blinked, or that the displayed form of the pointed device with the cursor may be altered, although the changes are not shown in FIG. 2. Furthermore, the selection and decision of the device can be confirmed as the selection and decision by the clicking of the Select Input icon in the menu 18.

Such a variation of the graphic items 20a–20c and 21a–21c into the ordinate axis direction and the abscissa axis direction so as to correspond to the connection state of the devices 11, 12, 14–16 and the digital bus 13 shown in the FIGS. 25 and 26 makes it possible to make the discrimination of the connection state of the devices 11–16 very simply and easily.

Next, the drawings are referred while the selection method of the devices connected with the electronic equipment as a second embodiment of the present invention is described.

The configuration for carrying out the selection method of the devices connected with the electronic equipment of the second embodiment is the same as that shown in the FIGS. 25 and 26 regarding the prior art, in which a television receiver 10 as the electronic equipment is equipped with a plurality of input/output terminals. The plurality of input/output terminals are configured as follows. That is, a first analog device (VTR) 11 is connected with the input/output terminal Line-1 to which analog signals are input and output; a second analog device (LDP) 12 is connected with the input/output terminal Line-2 to which analog signals are input and output; a first digital device (VCR) 14 as a daisy-chained Device-1 is connected with an input/output terminal connected with a digital bus 13 for digital signals conforming to the IEEE standard 1394; a second digital device (HDD) 15 as a Device-2 is connected with the digital bus 13; and a third digital device (DVD) 16 as a Device-3 is connected with the digital bus 13.

Figure 3:
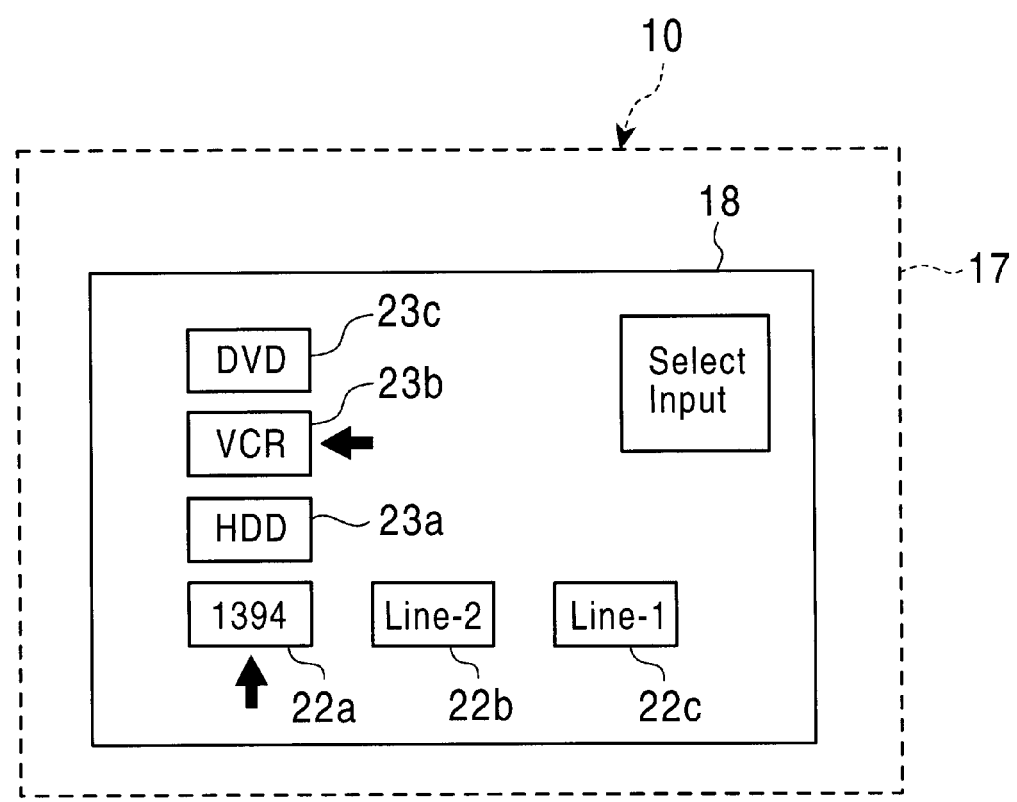
FIG. 3 is an explanatory view showing a menu screen in which devices capable of being physically connected are shown in an abscissa axis direction and devices capable of being logically discriminated are shown in an ordinate axis direction under the selection method of a second embodiment according to the present invention.

For selecting a device in the configuration of the television receiver 10, a user, first, selects a desired device among the graphic items 22a–22c and 23a–23c representing the connected devices 11, 12, 14–16 and the digital bus 13 while observing a menu 18 displayed on a screen 17 of the television receiver 10 in a manner of superimposition as shown in FIG. 3. In the screen display of the menu 18, there are included the graphic items 22a–22c arranged in an abscissa axis direction, which are indicative of the devices 11, 12 and the digital bus 13 distinguishable physically, and the graphic items 23a–23c arranged in an ordinate axis direction, which are indicative of the devices 14–16 connected with the digital bus 13, and the connection state of which can logically be discriminated.

Incidentally, the physically distinguishable input/output terminals include in a mingled state the input/output terminals Line-1, Line-2 to which analog signals are input and output, and the input/output terminal to be connected with the digital bus 13 and to which digital signals are input and output. The devices the connection state of which can logically be discriminated are the digital devices 14–16 connected with the digital bus 13 in a daisy chain state. In the present embodiment, the physically connectable devices 11, 12 and the digital bus 13 are represented by the graphic items 22b (Line-1), 22c (Line-2) and 22a ("1394 ") that are displayed in the abscissa axis direction. The graphic item "VCR" (23b) corresponding to the first digital device 14, the graphic item "HDD" (23a) corresponding to the second digital device 15, and the graphic item "DVD" (23c) corresponding to the third digital device 16 are displayed as the logically discriminable devices 14–16 to be displayed in the ordinate axis direction.

For selecting the devices 11, 12, 14–16 and the digital bus 13 displayed as the graphic items 22a–22c and 23a–23c in the abscissa axis direction and the ordinate axis direction, respectively, the user first selects one of graphic items of the input/output terminals "1394" (22a), Line-2 (22b), Line-1 (22c) displayed in the abscissa axis direction by pointing the input/output terminal with a cursor as shown in FIG. 3. In the case of the present embodiment shown in FIG. 3, the input/output terminal "1394" (22a) connected with the digital bus 13 is pointed to be selected. In the case where the user selects one of the input/output terminals Line-1, Line-2 to be connected with the devices for analog signals, the user can select the input/output terminal in a single operation. However, when the user first selects the input/output terminal "1394 " (22a) like in the present embodiment shown in FIG. 3, the user next has to select one of the graphic items 23a–23c, displayed in the ordinate axis direction, of the devices 14–16 connected with the digital bus 13 ("1394" (22a)) in a state of the daisy chain. In the present embodiment shown in FIG. 3, the VCR (23b) is selected. In this case, if the user selects one of the devices 14–16 connected with the digital bus 13 at the beginning, the user can select the device only in a single operation. If the user selects the VCR (23b) first, like in this embodiment, the VCR (23b) is selected by the single selection operation.

Next, the attached drawings are referred while a piece of electronic equipment realizing a third embodiment selection method of the devices connected with the electronic equipment is described.

Figure 4:
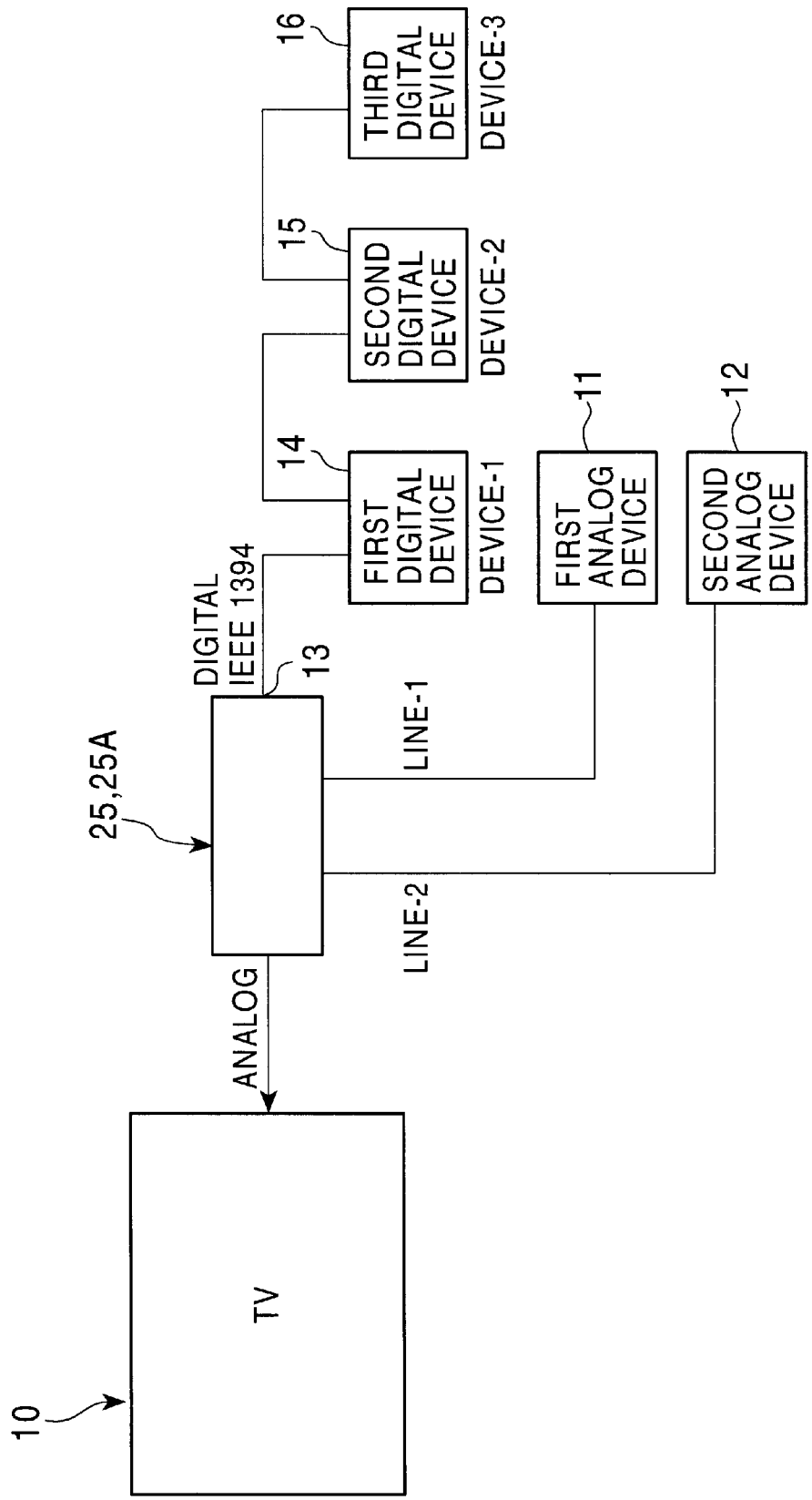
FIG. 4 is an explanatory view showing the connection configuration of the electronic equipment realizing the selection method of a third embodiment and a fourth embodiment according to the present invention.

The electronic equipment is constituted of a piece of electronic equipment 25 connected with a television receiver 10 and a plurality of devices 11, 12, 14–16 and a digital bus 13 connected with the input/output terminals of the electronic equipment 25 as shown in FIG. 4. In the configuration, a first analog device (e.g. VTR) 11 is connected with the input/output terminal Line-1 to be connected with a device for analog signals; a second analog device (e.g. LDP) 12 is connected with the input/output terminal Line-2 to be connected with a device for analog signals; a digital bus 13 conforming to the IEEE standards 1394 is connected with an input/output terminal to and from which digital signals are input and output; a first digital device (VCR in the present embodiment) 14 is connected with the digital bus 13 as a Device-1 in a daisy-chained way; a second digital device (HDD in the present embodiment) 15 is connected with the digital bus 13 as a Device-2 in the daisy-chained way; and a third digital device (DVD in the present embodiment) 16 is connected with the digital bus 13 as a Device-3 in the daisy-chained way. Incidentally, it is needless to say that the electronic equipment 25 may be integrated with the television receiver 10 to be a single unit, or may be a device controller such as a separated receiver.

The thus configured electronic equipment 25 has a function of displaying a menu on the screen of the television receiver 10 in a superimposed way (OSD) for the selection of the devices.

Figure 5:
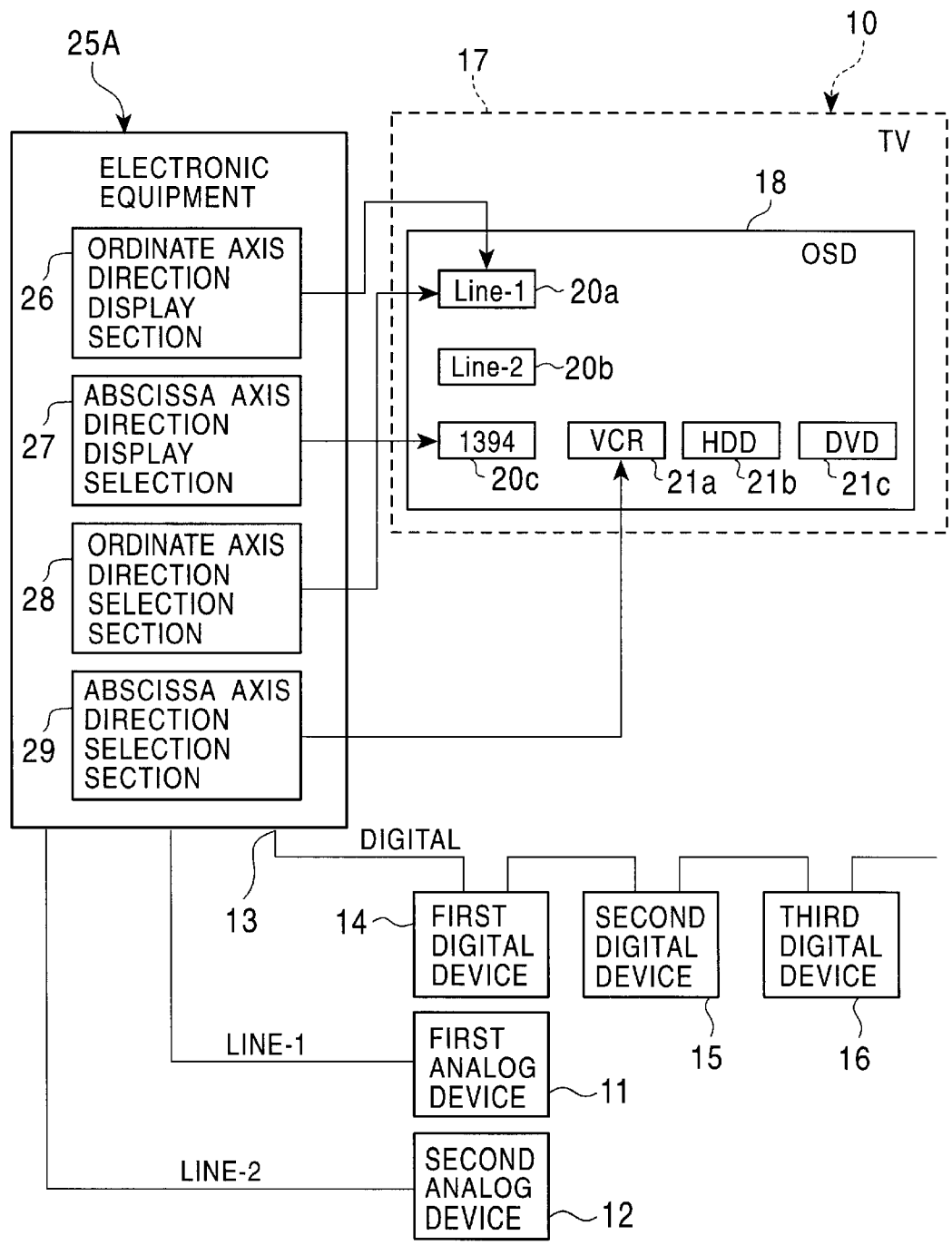
FIG. 5 is an explanatory view showing the connection configuration and a menu screen of the electronic equipment realizing the selection method of the third embodiment according to the present invention.

As shown in FIG. 5, the configuration for the display and the selection of the menu 18 includes an ordinate axis direction display section 26 as ordinate axis direction display means for displaying the graphic items 20a–20c representing the devices 11, 12 and the digital bus 13 connected with a plurality of physically connectable input/output terminals in an ordinate axis direction, an abscissa axis direction display section 27 as abscissa axis direction display means for displaying the graphic items 21a–21c corresponding to the devices 14–16, which are connected with the digital bus 13 and their connection states can be logically discriminated, in the abscissa axis direction, an ordinate axis direction selection section 28 as ordinate axis direction selection means for selecting the input/output terminals by selecting the graphic items 20a–20c displayed in the ordinate axis direction by the ordinate axis direction display means, and an abscissa axis direction selection section 29 as abscissa axis direction selection means for selecting the graphic items 21a–21c displayed in the abscissa axis direction by the abscissa axis direction display means.

In the thus configured electronic equipment 25 and the television receiver 10 performing the superimposed display, the input/output terminals Line-1 (to be connected with the first device) (20a), and Line-2 (to be connected with the second device) (20b) for analog signals, and the input/output terminal "1394 " (20c) for digital signals are displayed in the ordinate axis direction so that the physically connectable input/output terminals are displayed in the ordinate axis direction. Moreover, the daisy-chained devices, that is, the VCR (the first digital device) (21a), the HDD (the second digital device) (21b), and the DVD (the third digital device) (21c), which are connected with the digital bus 13 conforming to the IEEE standards 1394 connected with the logically discriminable input/output terminal "1394", are displayed in the abscissa axis direction. With regard to the display of the menu 18, the ordinate axis direction selection section 28 and the abscissa axis direction selection section 29 first select the graphic items 20a–20c displayed in the ordinate axis direction, and then select the graphic items 21a–21c displayed in the abscissa axis direction. For example, when the graphic items of the input/output terminals Line-1 (20a), Line-2 (20b), and "1394" (20c) are displayed in the ordinate axis direction, a user can specify a device by pointing and selecting the graphic item of the input/output terminal "1394" (20c) with the cursor, and then by pointing and selecting the graphic item of the VCR (21a) displayed in the abscissa axis direction adjoining the graphic item 20c ("1394"). Moreover, when the user directly points and selects the graphic item 21a representing the VCR, the user can directly point and select the VCR without the selection operation of the graphic items in the ordinate axis direction.

Next, the attached drawings are referred while a piece of electronic equipment realizing a selection method of the devices connected with the electronic equipment according to a fourth embodiment is described.

The electronic equipment of the fourth embodiment has the same configuration as that of the electronic equipment realizing the selection method of the third embodiment illustrated in FIG. 4. The electronic equipment realizing the selection method of the fourth embodiment includes electronic equipment 25A connected with a television receiver 10, and a plurality of devices 11, 12, 14–16 and a digital bus 13 connected with the input/output terminals of the electronic equipment 25A. In the configuration, a first analog device (VTR, for example) 11 is connected with the input/ output terminal Line-1 to be connected with a device for analog signals; a second analog device (LDP, for example) 12 is connected with the input/output terminal Line-2 to be connected with a device for analog signals; a digital bus 13 conforming to the IEEE standards 1394 is connected with an input/output terminal to be connected with devices for digital signals; a first digital device (VCR in the present embodiment) 14 is connected with the digital bus 13 as a Device-1 in a daisy-chained way; a second digital device (HDD in the present embodiment) 15 is connected with the digital bus 13 as a Device-2 in the daisy-chained way; and a third digital device (DVD in the present embodiment) 16 is connected with the digital bus 13 as a Device-3 in the daisy-chained way. Incidentally, it is the same as the third embodiment that the electronic equipment 25A may be integrated with the television receiver 10 to be a single unit, or may be formed into a separated body.

The thus configured electronic equipment 25A has a function of displaying a menu on the screen of a television receiver 10 in a superimposed way (OSD) for the selection of the devices.

Figure 6:
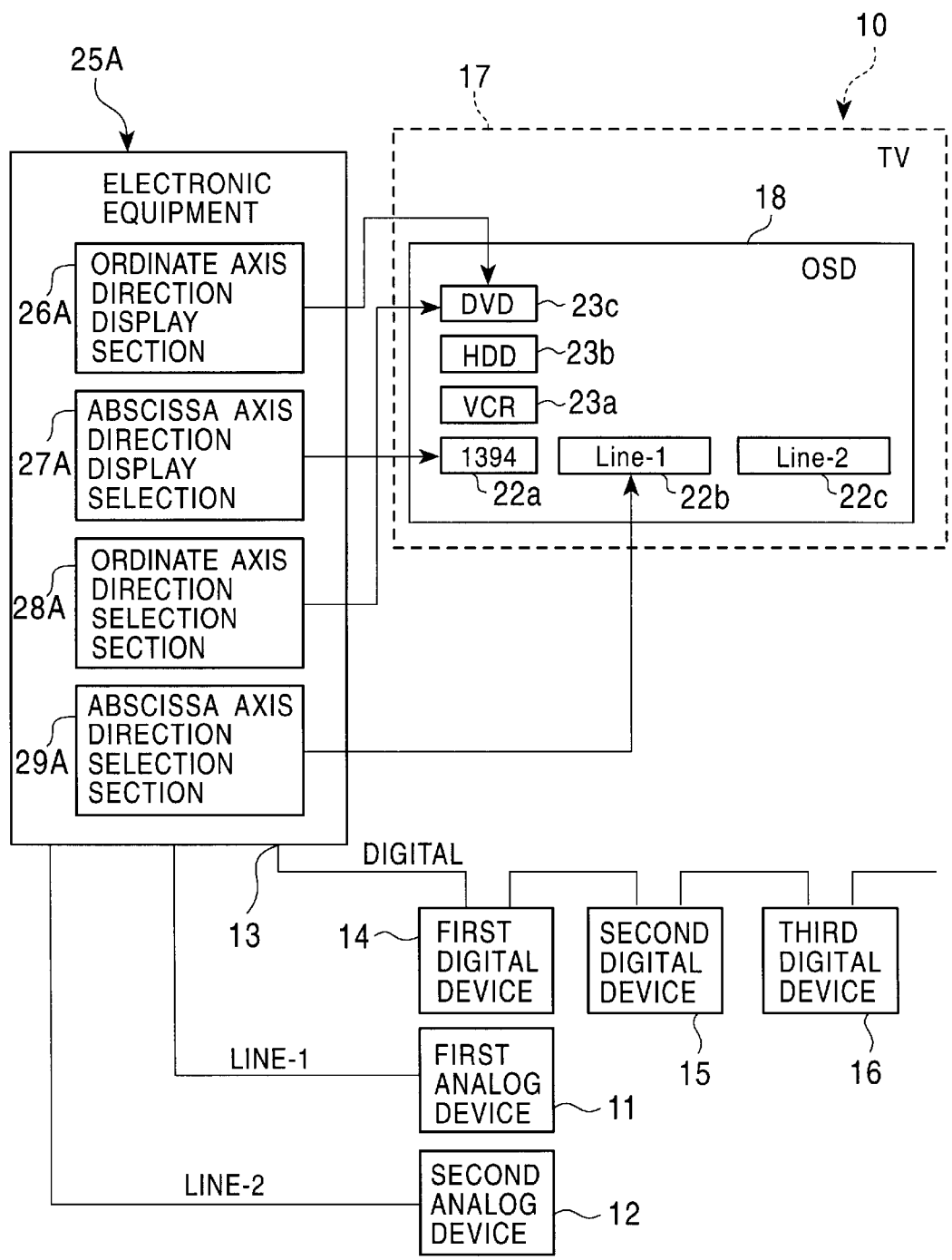
FIG. 6 is an explanatory view showing the connection configuration and a menu screen of the electronic equipment realizing the selection method of the fourth embodiment according to the present invention.

As shown in FIG. 6, the configuration for the display and the selection of a menu 18 includes an abscissa axis direction display section 27A as abscissa axis direction display means for displaying the graphic items 22a–22c corresponding to a plurality of physically connectable devices 11, 12 and the digital bus 13 in an abscissa axis direction, an ordinate axis direction display section 26A as ordinate axis direction display means for displaying the graphic item 23a–23c corresponding to the devices 14–16, which are connected with the digital bus 13 and their connection states can be logically discriminated, in the ordinate axis direction, an abscissa axis direction selection section 29A as abscissa axis direction selection means for selecting the input/output terminals by selecting the graphic items 22a–22c displayed in the abscissa axis direction by the abscissa axis direction display means, and an ordinate axis direction selection section 28A as ordinate axis direction selection means for selecting the graphic items 23a–23c displayed in the ordinate axis direction by the ordinate axis direction display means.

In the thus configured electronic equipment 25A, the graphic items of the input/output terminals Line-1 (to be connected with the first device) (22b), and Line-2 (to be connected with the second device) (22c) to be connected with devices for analog signals, and the input/output terminal "1394" (22a) to be connected with devices for digital signals are displayed in the abscissa axis direction so that the physically connectable input/output terminals are displayed in the abscissa axis direction. Moreover, the daisy-chained devices, the VCR (the third device) (23a), the HDD (the fourth device) (23b), and the DVD (the fifth device) (23c), which are connected with the digital bus 13 conforming to the IEEE standards 1394 and being connected with the logically discriminable input/output terminal "1394", are displayed in the ordinate axis direction. To the display of the menu 18, the abscissa axis direction selection section 29A and the ordinate axis direction selection section 28A first select the graphic items 22a–22c displayed in the abscissa axis direction, and then select the graphic items 23a–23c displayed in the ordinate axis direction. For example, when the input/output terminals Line-1 (22b), Line-2 (22c), and "1394" (22a) are displayed in the abscissa axis direction, a user can specify a device by pointing and selecting the input/output terminal "1394" (22a) with a cursor, and then by pointing and selecting the DVD (23c) displayed in the ordinate axis direction adjoining the graphic item 22a ("1394"). On the other hand, when the user directly points and selects the graphic item 23c representing the DVD, the user can directly point and select the DVD without the selection operation of the graphic items in the abscissa axis direction.

Next, the attached drawings are referred while a piece of electronic equipment realizing a selection method of the devices connected with the electronic equipment according to a fifth embodiment is described.

Figure 7:
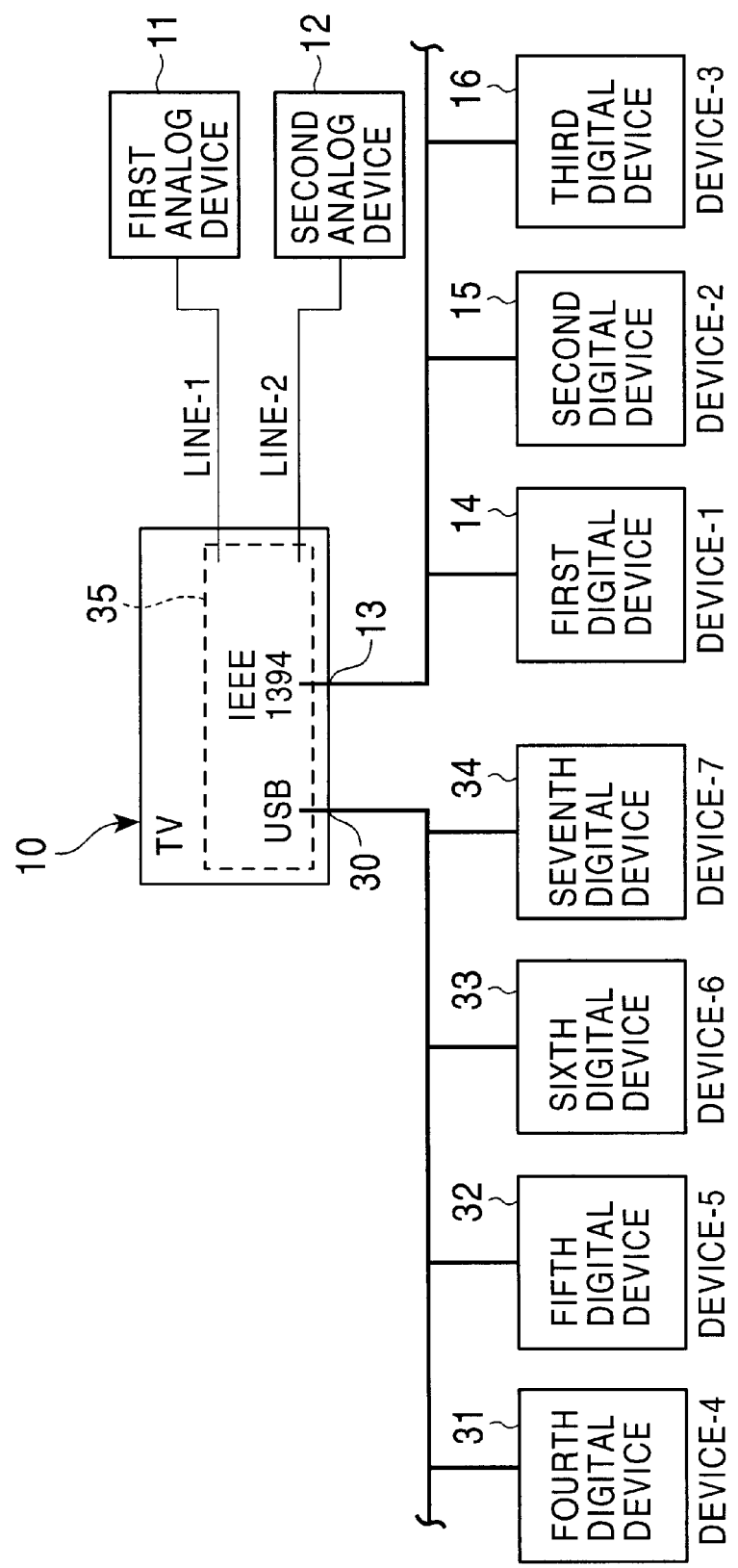
FIG. 7 is a block diagram showing the connection configuration of the electronic equipment realizing a selection method of a fifth embodiment according to the present invention.

In the configuration of the electronic equipment realizing the selection method of the devices connected with the electronic equipment according to the fifth embodiment, a television receiver 10 as the electronic equipment is equipped with a plurality of input/output terminals, and has a function of connecting the selected devices connected with the input/output terminals with each other. In the configuration, the television receiver 10 includes the input/output terminals and an equipment control section 35 for connecting the devices with each other as shown in FIG. 7.

It is possible to connect devices having different protocols with the input/output terminals in physically different forms. In the configuration, a first analog device (VTR, for example) 11 is connected with the input/output terminal Line-1 to be connected with a device for analog signals; a second analog device (LDP, for example) 12 is connected with the input/output terminal Line-2 to be connected with a device for analog signals; a first digital device (VCR, for example) 14 is connected with the input/output terminal to be connected with the digital signal devices connected with a digital bus 13 conforming to the IEEE standards 1394 as a Device-1 in a daisy-chained way; a second digital device (HDD, for example) 15 is connected with the input/output terminal as a Device-2 in the daisy-chained way; and a third digital device (DVD, for example) 16 is connected with the input/output terminal as a Device-3 in the daisy-chained way. A fourth digital device (a memory card such as a memory stick(registered trademark), for example) 31 is connected with an input/output terminal to be connected with a digital bus 30 conforming to the Universal Serial Bus (USB) standards as a Device-4; a fifth digital device (a still camera, for example) 32 is connected with the input/output terminal as a Device-5; a fifth digital device (a scanner, for example) 33 is connected with the input/output terminal as a Device-6; and a seventh device (a video camera, for example) 34 is connected with the input/output terminal as a Device-7.

Figure 8:
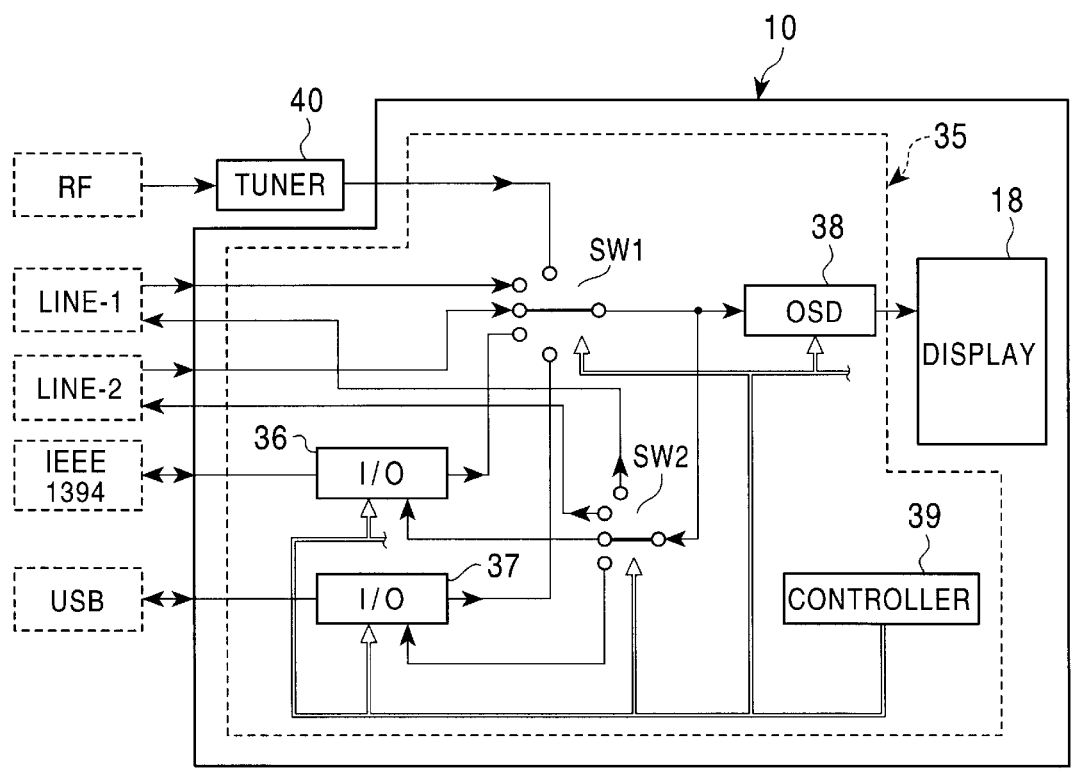
FIG. 8 is a schematic connection diagram showing the equipment control section for connecting the devices shown in FIG. 7.

The equipment control section 35 connects a selected device as an inputting device with the television receiver 10; the equipment control section 35 connects a selected device as an outputting device with the television receiver 10; and the equipment control section 35 connects selected devices with each other. As shown in FIG. 8, the equipment control section 35 includes an input-switching switch SW1 for switching input side terminals among the input/output terminals physically, an output-switching switch SW2 for switching output side terminals among the input/output terminals physically, a first I/O section 36 for switching the devices connected with the input/output terminal conforming to the IEEE 1394 standards logically, a second I/O section 37 for switching the devices connected with the input/output terminal conforming to the USB standards, and a controller 39 for controlling these switches SW1, SW2, I/O sections 36, 37 and a superimposition display (OSD) section 38. Incidentally, the input-switching switch SW1 is configured to be able to receive the signals from a tuner 40. In this context, the "tuner 40" includes, for example, Communication Satellite (CS) broadcasting, Broadcasting Satellite (BS) broadcasting, and ground wave broadcasting.

In the thus configured equipment control section 35, the controller 39 controls the switches SW1, SW2 in accordance with a device selected on the menu displayed on the display 18 in a superimposed way, and connects devices with each other by connecting input/output terminals corresponding to the devices by means of the logical operations of the I/O sections 36, 37. Or, the controller 39 selects the devices for receiving signals or outputting signals.

Figure 9:
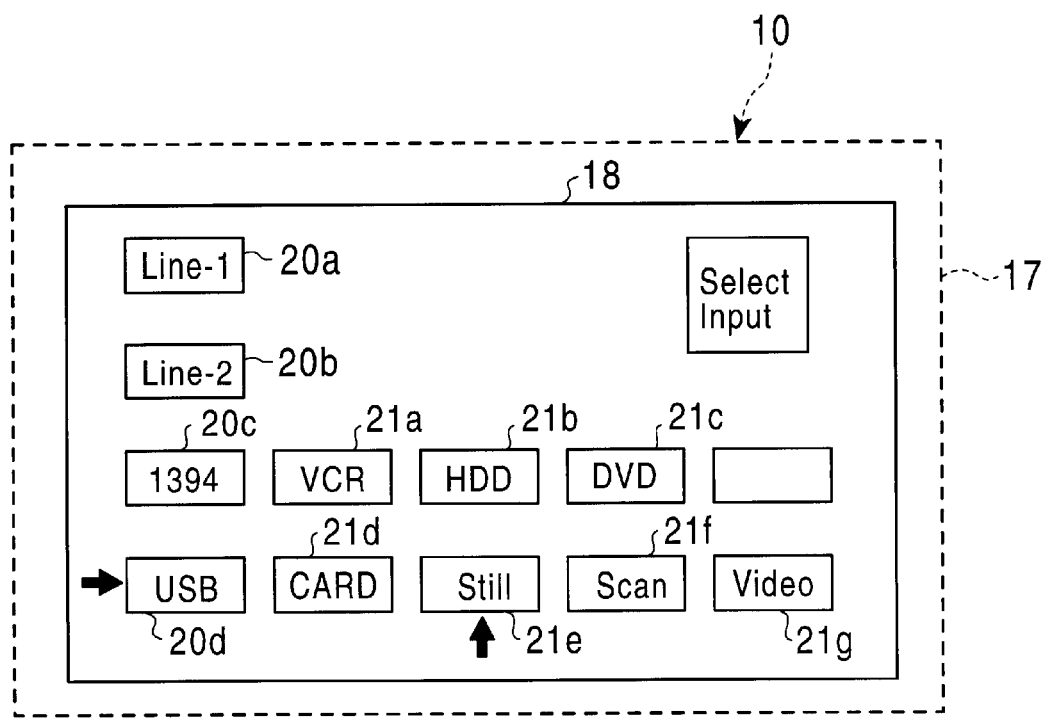
FIG. 9 is an explanatory view showing a menu screen in which devices capable of being physically connected are shown in an ordinate axis direction and devices capable of being logically discriminated are shown in abscissa axis directions under the selection method of a fifth embodiment according to the present invention.

For selecting a device displayed in the superimposed way (OSD) in the thus configured television receiver 10, a user, at first, as shown in FIG. 9, selects a desired device among the graphic items 20a, 20b, 21a–21c and 21d–21g corresponding respectively to the connected devices 11, 12, 14–16 and 31–34 while observing a menu 18 displayed on the screen 17 of the television receiver 10 in the superimposed way. In the screen display of the menu 18 are included the graphic items 20a–20d arranged in an ordinate axis direction, which are displays of the devices 11, 12 and the digital buses 13, 30 having different protocols and physically different forms from each other, and the graphic items 21a–21g arranged in abscissa axis directions, which are indicative of the digital devices 14–16 and 31–34 connected with the input/output terminal of the IEEE standards 1394 and the input/output terminal of the USB standards, respectively, and the connection states of which can logically be discriminated. The user selects the devices 11, 12, 14–16, 31–34 and the digital buses 13, 30 by selecting any one of the graphic items 20a–20d, and 21a–21g displayed in the ordinate axis direction and the abscissa axis directions, respectively.

Incidentally, the input/output terminals Line-1, Line-2 to be connected with the devices for analog signals and the input/output terminals to be connected with the devices connected with digital buses 13, 30 are all included in the input/output terminals with which devices having different protocols can be connected in physically different forms. In the present embodiment, the graphic items 20a–20d that are displayed in the ordinate axis direction represent the input/output terminals Line-1 (20a: to be connected with the first analog device 11), Line-2 (20b: to be connected with the second analog device 12), "1394 " (20c: the digital bus 13 conforming the IEEE standards 1394), and "USB" (20d: the digital bus 30 in master/slave relations conforming to the USB standards).

The graphic items 21a–21c representing the VCR (21a) as the first digital device, the HDD (21b) as the second digital device, and the DVD (21c) as the third digital device 16, all of which are the logically discriminable devices that are connected with the digital bus 13 conforming to the IEEE standards 1394, are displayed in the abscissa axis direction. Besides, the graphic items 21d–21g representing a memory card (CARD) (21d) corresponding to the fourth digital device 31, a still camera (Still) (21e) corresponding to the fifth digital device 32, a scanner (Scan) (21f) corresponding to the sixth digital device 33, and a video camera (Video) (21g) corresponding to the seventh digital device 34, all of which are the logically discriminable devices that are connected with the digital bus 30 conforming to the USB standards, are displayed in the abscissa axis direction.

In the case where the devices 11, 12, 14–16, 31–34 and the digital buses 13, 30 are displayed as the graphic items 20a–20d, 21a–21g in the ordinate axis direction and the abscissa axis directions, the user first selects one of the graphic items 20a–20d (devices 11, 12, digital buses 13, 30) displayed in the ordinate axis direction. In the case of the embodiment shown in FIG. 9, the graphic item 20d (USB) indicated by a cursor is selected.

Next, in the case where the user selects one of the devices 14–16, 31–34 (graphic items 21a–21g displayed in the abscissa axis directions), the user selects one of the graphic items 21d–21g displayed in an abscissa axis direction adjoining the graphic item 20d of the devices 31–34 as a desired device, the device "Still" (21e) in the present embodiment shown in FIG. 9, and then the fifth digital device 32, that is, the still camera is selected.

As the selection method of the devices 14–16, 31–34, the graphic items 21a–21g of which are displayed in the abscissa axis directions, there is another method, in which one of the graphic items is selected, in addition to the method described immediately above. That is, it can be applicable that the user first selects one of the devices 14–16, 31–34, the graphic items 21a–21g of which are displayed in the abscissa axis directions, and then the user selects one of the devices 11, 12 and the digital buses 13, 30, the graphic items 20a–20d of which are displayed in the ordinate axis direction.

In the case of the embodiment shown in FIG. 9, the user selects the graphic item "Still" 21e) at first, and then the user selects the input/output terminal "USB" (20d) in the ordinate axis direction. Incidentally, it is needless to say that the displaying state of the graphic item selected and decided with the cursor by the user may be displayed to be inverted or blinked, or that the displayed form of the pointed device with the cursor may be altered, although the changes are not shown in FIG. 9. Furthermore, the selection and the decision of the device can be confirmed as the selection and decision by the clicking of the Select Input icon in the menu 18.

Such a variation of the graphic items 20a–20d and 21a–21g into the ordinate axis direction and the abscissa axis directions so as to correspond to the connection state of the devices 11, 12, 14–16, 31–34 makes it possible to make the discrimination of the connection states of the devices 11, 12, 14–16, 31–34 very simply and easily.

Next, an embodiment, in which devices connected with the electronic equipment are connected to each other, is described. The devices are connected with each other by the control of the switches SW1, SW2 of the equipment control section 35 shown in FIG. 8.

Figure 10:
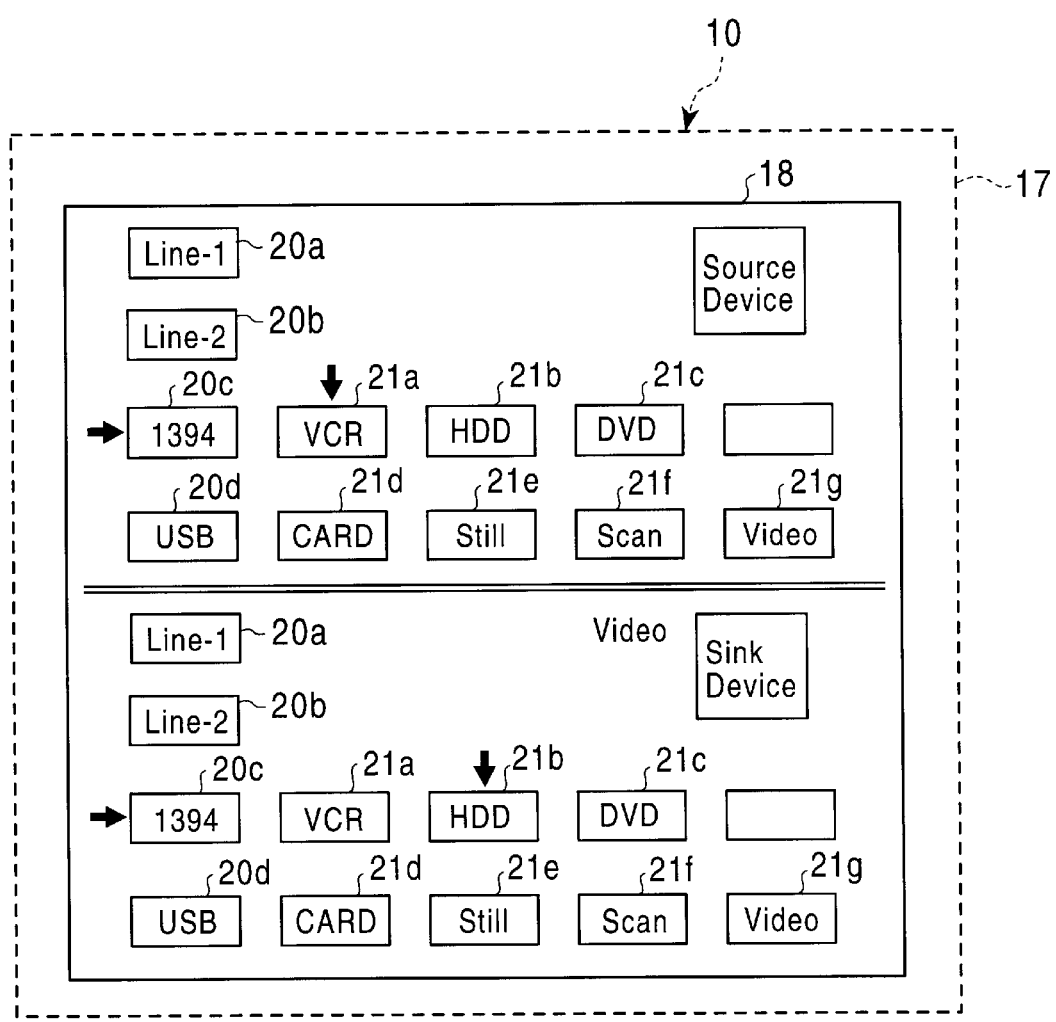
FIG. 10 is an explanatory view showing a menu screen of the electronic equipment realizing the fifth embodiment selection method according to the present invention for connecting respective devices.

At first, for performing the connection between the devices, a user selects a device in a menu 18 displayed on the television receiver 10 in a superimposed way (OSD) as shown in FIG. 10. That is, the user observes the menu 18 displayed on the screen 17 of the television receiver 10 in the superimposed way while the user selects a desired device among the devices 11, 12, 14–16, 31–34. In the screen display of the menu 18, there are displayed a menu of source devices (Source Device) for the selection of the devices on the source side, and a menu of sink devices (Sink Device) for the selection of the devices on the destination side. The display modes of both of the menus are the same.

The menu of source devices and the menu of sink devices are constituted of the graphic items 20a–20d, which are arranged in the ordinate axis direction and represent a plurality of physically discriminable devices 11, 12 and the digital buses 13, 30, and graphic items 21a–21g, which are arranged in the abscissa axis directions and represent the devices 14–16 and 31–34, which are connected with the input/output terminals "1394 " and "USB", respectively, and the connection state of which can logically be discriminated.

The user selects the devices and buses 11–16, 30–34 by selecting any one of the graphic items 20a–20d and 21a–21g displayed in the ordinate axis direction and the abscissa axis directions. In the present embodiment, the devices 11, 12 and the digital buses 13 and 30, which are indicated by the graphic items 20a–20d displayed in the ordinate axis direction and have physically different forms, are designated in the menu 18 by the graphic items representing the input/output terminals Line-1 (20a: the first analog device 11), Line-2 (20b: the second analog device 12) to be connected with the devices for analog signals, and the input/output terminals "1394" (20c), "USB" (20d) to be connected with the digital buses 13, 30, respectively, the digital bus 13 fitted to the protocols conforming to IEEE standards 1394, the digital bus 30 fitted to be in master/slave relations.

The digital devices 14–16, which are connected with the digital bus 13 conforming to the IEEE standards 1394 and can logically be discriminated, are displayed by the following graphic items arranged in the abscissa axis direction: the graphic item 21a (VCR: the first digital device 14), the graphic item 21b (HDD: the second digital device 15), and the graphic item 21d (DVD: the third digital device 16). Moreover, as the digital devices 31–34, which are connected with the digital bus 30 conforming to the USB standards and the graphic items of which are arranged in the abscissa axis direction, the CARD (21d) indicating the memory card corresponding to the fourth digital device 31, the Still (21e) indicating the still camera corresponding to the fifth digital device 32, the Scan (21f) corresponding to the sixth digital device 33, and the Video (21g) corresponding to the seventh digital device 34 are displayed.

When the graphic items 20a–20d, 21a–21g corresponding to the devices 11, 12, 14–16, 31–34 and digital buses 13, 30 are displayed in the ordinate axis direction and the abscissa axis directions as the menus of the source devices and the sink devices, a user, at first, selects one of the graphic items 20a–20d (devices 11, 12 and digital buses 13, 30) displayed in the ordinate axis direction on the source device side. In the present embodiment shown in FIG. 10, the user selects the graphic item 20c (input/output terminal 1394) by pointing it with the cursor.

Next, when the user selects one of the graphic items 21a–21c, 21d–21g displayed in the abscissa axis directions corresponding to the digital devices 14–16, 31–34, respectively, the user selects a desired device among the graphic items 21a–21c displayed in the abscissa axis directions adjoining the graphic item 20c, for example, the graphic item 21a ("VCR") in the present embodiment shown in the FIG. 10, and then the video cassette recorder is selected.

Next, the user selects a device on the destination side in the menu on the sink device side. When the graphic items 20a–20d, 21a–21g in the ordinate axis direction and the abscissa axis directions corresponding to the devices 11, 12, 14–16, 31–34 and digital buses 13, 30, the user first selects a graphic item among the graphic items 20a–20d corresponding to the devices 11, 12 and the digital buses 13, 30 in the ordinate axis direction on the sink device side. In the present embodiment shown in FIG. 10, the user selects the graphic item 20c ("1394 ") with the cursor.

Next, when the user selects one of the graphic items 21a–21c, 21d–21g displayed in the abscissa axis directions corresponding to the devices 14–16, 31–34, respectively, the user selects a desired device among the graphic items 21a–21c displayed in the abscissa axis directions adjoining the graphic item 20c, for example, the graphic item 21b ("HDD") in the present embodiment shown in the FIG. 10, and then the hard disk drive is selected.

The user thus selects the "VCR" connected with the digital bus 13 conforming the IEEE standards 1394 on the source device side in the menu 18, and selects the "HDD" connected with the digital bus 13 on the sink device side in the menu 18. Then, the "VCR" and the "HDD" become connectable to each other as the connectable devices. Consequently, the transmission and the reception of data between the connectable devices can be performed in conformity with not shown operations. Moreover, the technique for selecting the devices in the menu 18 can be applied to specify a device from which signals are input and to specify a device to which signals are output.

Next, the attached drawings are referred while a piece of electronic equipment realizing a selection method of the devices connected with the electronic equipment according to a sixth embodiment is described. A displayed menu for the selection of a device among the devices in the electronic equipment is configured so that graphic items capable of being physically connected are displayed in an abscissa axis direction and graphic items capable of being logically discriminated are displayed in ordinate axis directions.

Because the configuration for realizing the selection method of the devices connected with the electronic equipment of the selection method of the sixth embodiment is the same as that of the electronic equipment of the selection method of the fifth embodiment shown in FIGS. 7 and 8, the description of the connection state of the configuration is omitted.

Figure 11:
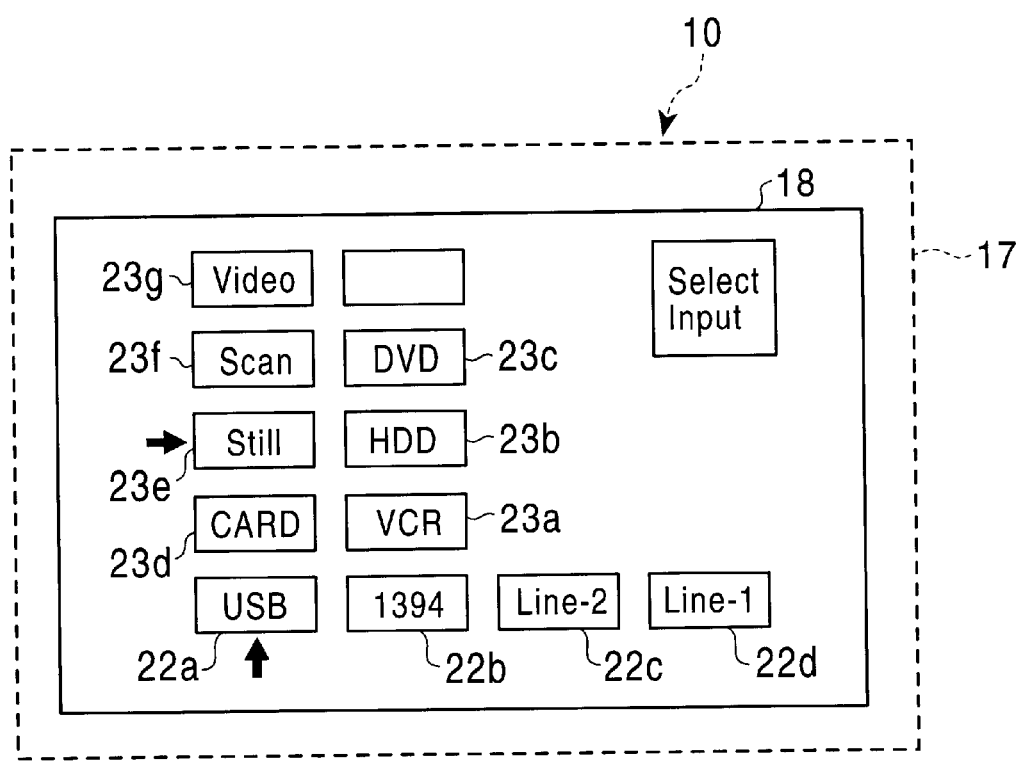
FIG. 11 is an explanatory view showing a menu screen in which devices capable of being physically connected are shown in an abscissa axis direction and devices capable of being logically discriminated are shown in ordinate axis directions in the connection configuration of the electronic equipment of a sixth embodiment selection method according to the present invention.

For selecting a device displayed in the superimposed way (OSD) in the thus configured television receiver 10, a user, at first, as shown in FIG. 11, selects a desired device among the graphic items 22a–22d and 23a–23g corresponding to the digital buses 13, 30 and the connected devices 11, 12, 14–16 and 31–34 while observing a menu 18 displayed on a screen 17 of the television receiver 10 in a superimposed way. In the screen display of the menu 18, there are included the graphic items 22a–22d, which correspond to a plurality of physically discriminable devices 11, 12 and the digital buses 13, 30 and are arranged in an abscissa axis direction, and the graphic items 23a–23g, which are arranged in ordinate axis directions and represent the devices 14–16 and 31–34 connected with the input/output terminal "1394" of the IEEE standards 1394 and the input/output terminal "USB" of the USB standards, respectively, and the connection states of which can logically be discriminated.

In the case where the devices 11, 12, 14–16, 31–34 and digital buses 13, 30 are displayed as the graphic items 22a–22d, 23a–23g in the ordinate axis directions and the abscissa axis direction, a user first selects one of the graphic items 22a–22d (that is, the devices 11, 12 and the digital buses 13, 30) displayed in the abscissa axis direction. In the case of the embodiment shown in FIG. 11, the graphic item 22a (USB) indicated by the cursor is selected.

Next, in the case where the user selects one of the devices 31–34 (the graphic items 23a–23g displayed in the ordinate axis directions), the user selects one of the graphic items 23d–23g of the devices 31–34 adjoining the graphic item 22a as a desired device, the "Still" (23e) in the present embodiment shown in FIG. 11, and then the still camera is selected.

Such variations of the graphic items 22a–22d, 23a–23g into the ordinate axis directions and the abscissa axis directions so as to correspond to the connection state of the devices 11, 12, 14–16, 31–34 and the digital buses 13, 30 makes it possible to make the discrimination of the connection states of the devices 11, 12, 14–16, 31–34 and the digital buses 13, 30 very simply and easily.

Figure 12:
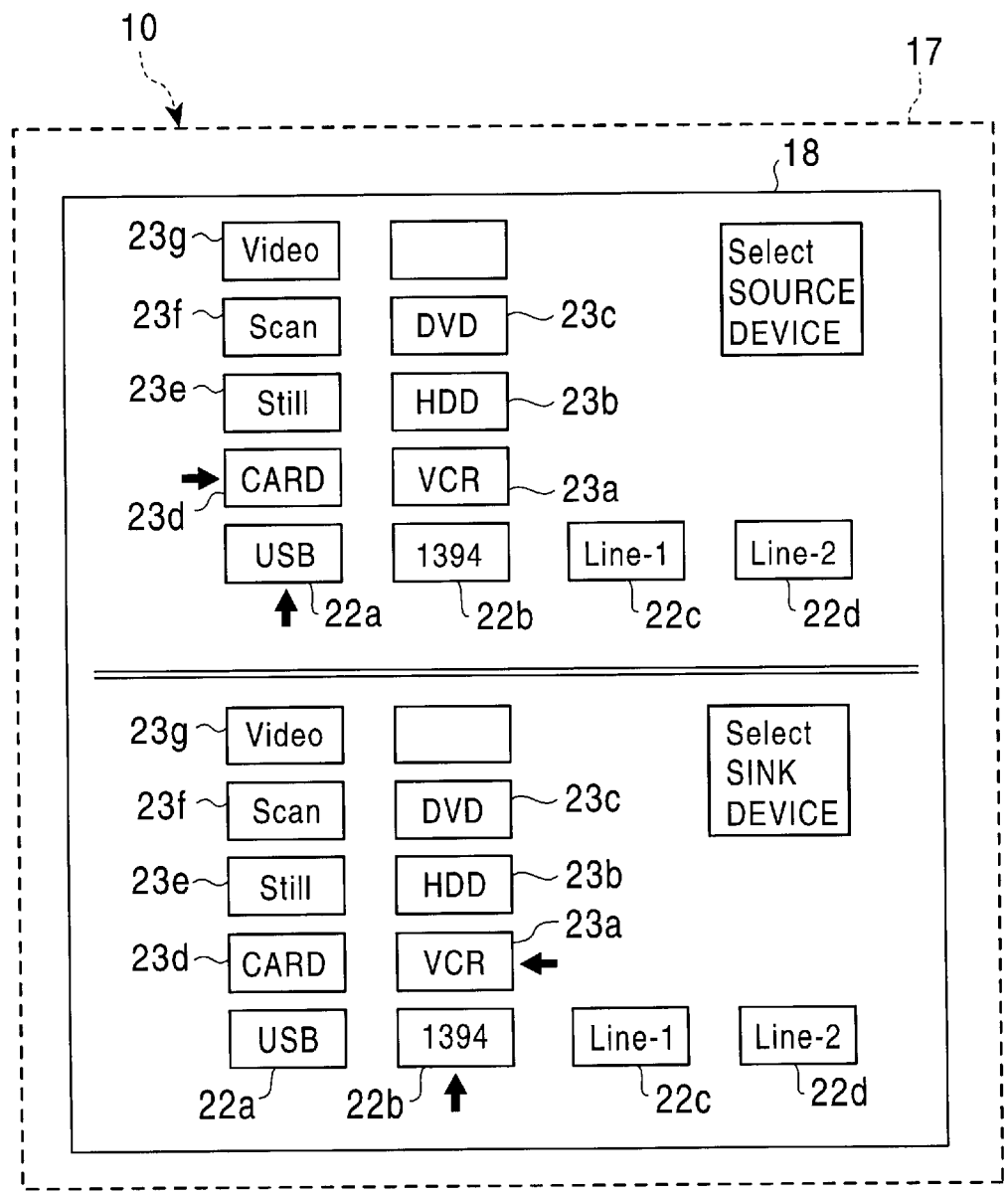
FIG. 12 is an explanatory view showing a menu screen of the electronic equipment of the sixth embodiment selection method according to the present invention for connecting respective devices.

Next, the devices are connected with each other by the control of the switches SW1, SW2 of the equipment control section 35 shown in FIG. 8 for the selection of the devices connected together. At first, for performing the connection between the devices, the user specifies a device from which signals are input in a source device portion of the menu 18 and a device to which signals are output in a sink device portion of the menu 18 by using the source device portion of the menu 18 for the selection of the devices on the source side and the sink device portion of the menu 18 for the selection of the device on the destination side the display modes of which are the same as shown in FIG. 12.

The menu of source devices and the menu of sink devices are constituted of graphic items 22a–22d, which are arranged in the abscissa axis direction and represent a plurality of physically discriminable devices 11, 12 and the digital buses 13, 30, and the graphic items 23a–23g, which are arranged in the ordinate axis directions and represent the devices 14–16 and 31–34, which are connected with the input/output terminals "1394", "USB" and the connection states of which can logically be discriminated.

When the graphic items 22a–22d, 23a–23g representing the devices 11, 12, 14–16, 31–34 and digital buses 13, 30 are displayed in the ordinate axis directions and the abscissa axis direction as the menus of the source devices and the sink devices, a user, at first, selects one of the graphic items 22a–22d (devices 11, 12 and digital buses 13, 30) displayed in the abscissa axis direction on the source device side. In the present embodiment shown in FIG. 12, the user has selected the graphic item 22a (USB) by pointing it with the cursor.

Next, the user selects one of the graphic items 23a–23g displayed in the ordinate axis direction, which adjoins the graphic item 22a, representing the devices 31–34. When the user selects the graphic item 23d (CARD) representing the fourth digital device in the embodiment, the memory card is selected.

Next, the user selects a device on the destination side in the menu on the sink device side. When the graphic items 22a–22d, 23a–23g representing the devices 11, 12, 14–16, 31–34 and the digital buses 13, 30 are displayed in the ordinate axis directions and the abscissa axis direction, the user first selects a graphic item among the graphic items 22a–22d representing the devices 11, 12 and the digital buses 13, 30 in the abscissa axis direction on the sink device side. In the present embodiment shown in FIG. 12, the user selects the graphic item 22b ("1394 ") with the cursor.

Next, when the user selects one of the graphic items 23a–23g displayed in the ordinate axis directions representing the devices 14–16, 31–34, the user selects a desired device among the graphic items 23a–23c displayed in the ordinate axis direction adjoining the selected graphic item 22b, e.g. the graphic item 23a (VCR) in the embodiment shown in the FIG. 12, and then the video cassette recorder is selected.

The user thus selects the "CARD" connected with the digital bus 30 conforming the USB standards on the source device side in the menu 18, and selects the "VCR" connected with the digital bus 13 on the sink device side in the menu 18. Then, the "CARD" and the "VCR" become connectable to each other as the connectable devices. Consequently, the transmission and the reception of data between the connectable devices can be performed in conformity with not shown operations.

Next, the attached drawings are referred while a piece of electronic equipment realizing a selection method of the devices connected with the electronic equipment according to a seventh embodiment is described. The electronic equipment is for enabling a user to observe usable devices and unusable devices displayed on a screen in a superimposed way.

In a configuration of the electronic equipment realizing the seventh embodiment selection method of the devices connected with the electronic equipment, a television receiver as the electronic equipment equipped with a plurality of input/output terminals. The television receiver has a function of specifying a device from which signals are input and a device to which signals are output in addition to a function of selecting devices connected with the electronic equipment. The configuration is the same as the connection form that is described about the fifth embodiment electronic equipment shown in FIGS. 7 and 8, and the description of the connection state of the configuration is omitted.

Figure 13:
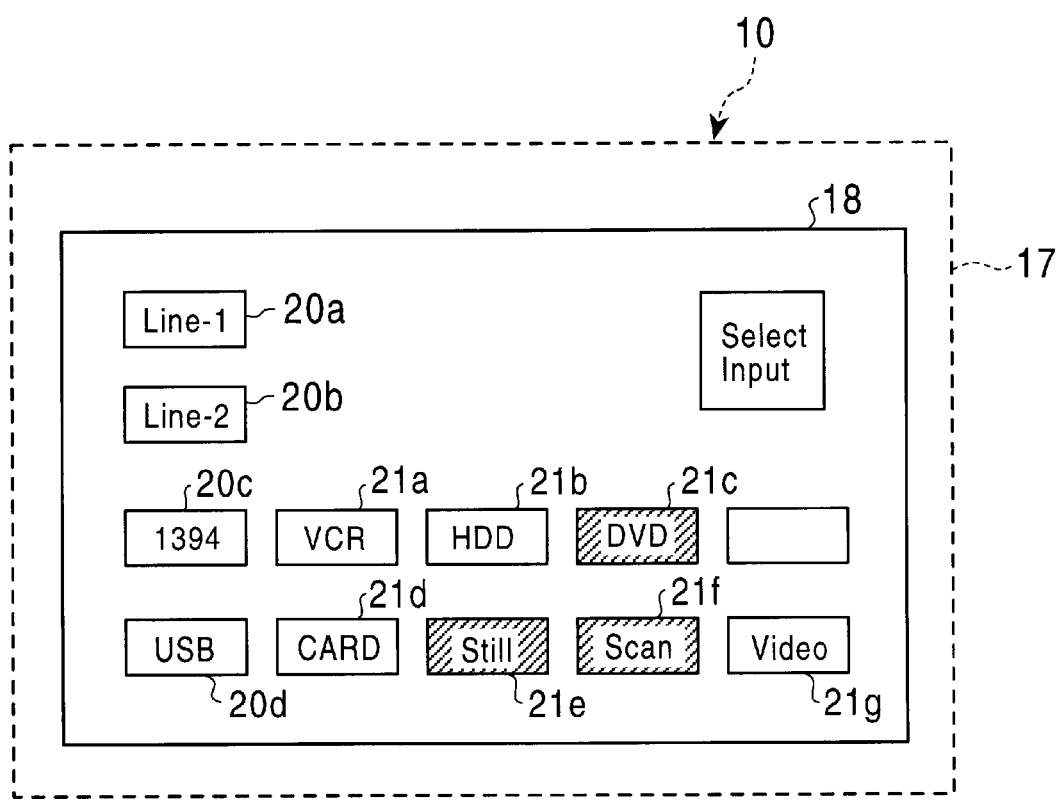
FIG. 13 is an explanatory view showing a menu screen capable of discriminating usable devices from unusable devices among the graphic items with eyes in the connection configuration of the electronic equipment of a seventh embodiment according to the present invention.

For selecting a device displayed on the television receiver 10 in a superimposed way (OSD), at first, as shown in FIG. 13, a user selects a desired device among the devices 11, 12, 14–16, 31–34 while observing the menu 18 displayed on the screen 17 of the television receiver 10 in the superimposed way. The screen display of the menu 18 includes the graphic items 20a–20d, which are indicative of the devices 11, 12 and the digital buses 13, 30, respectively, to all of which devices having different protocols can be connected in physically different forms, displayed in an ordinate axis direction, and the graphic items 21a–21g, which are indicative of the devices 14–16 and 31–34, respectively, the connection states of which to the digital bus 13 and 30 can logically be discriminated, displayed in the abscissa axis directions.

Figure 14:
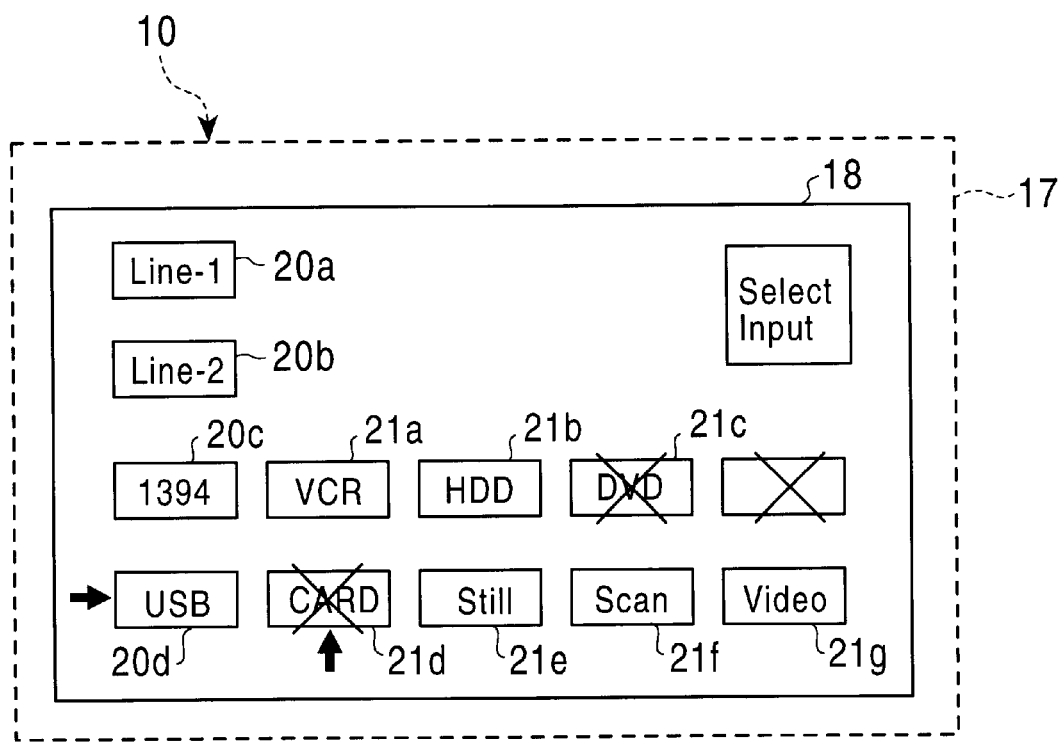
FIG. 14 is an explanatory view showing another menu screen capable of discriminating usable devices from unusable devices among the graphic items with eyes in the connection configuration of the electronic equipment of the seventh embodiment.

The graphic items 20a, 20b, 21a–21b representing the devices 11, 12, 14–16, 31–34 and being displayed in the ordinate axis direction and the abscissa axis directions are made to be clearly distinguishable while their power sources are turned off or they are not in accessible state by being displayed with half-tone dot meshing or with different enclosing lines or in different colors or with blinking. FIG. 13 shows that the first digital device 14, or the video cassette recorder "VCR", represented by the graphic item 21a is blinking because it is being accessed and that the third digital device 16, "DVD", represented by the graphic item 21c, the fifth digital device 32, "Still", represented by the graphic item 21e, and the sixth digital device, "Scan", represented by the graphic item 21f are in an unusable state because their power supply are turned off. Various display modes can be considerable as to the display. For example, in the menu shown in FIG. 14, a cross is marked to unusable devices. In the example, the unusable devices are the graphic item 21c representing the third digital device 16, "DVD", a frame "P" indicating an extra graphic item for the connection of a device, and the graphic item 21d representing the fourth digital device 31, "CARD". Thus, the states of the connected devices can be grasped and it becomes possible to decide not to use the unusable devices.

Next, the attached drawings are referred while a piece of electronic equipment realizing a selection method of the devices connected with the electronic equipment according to an eight embodiment is described.

Figure 15:
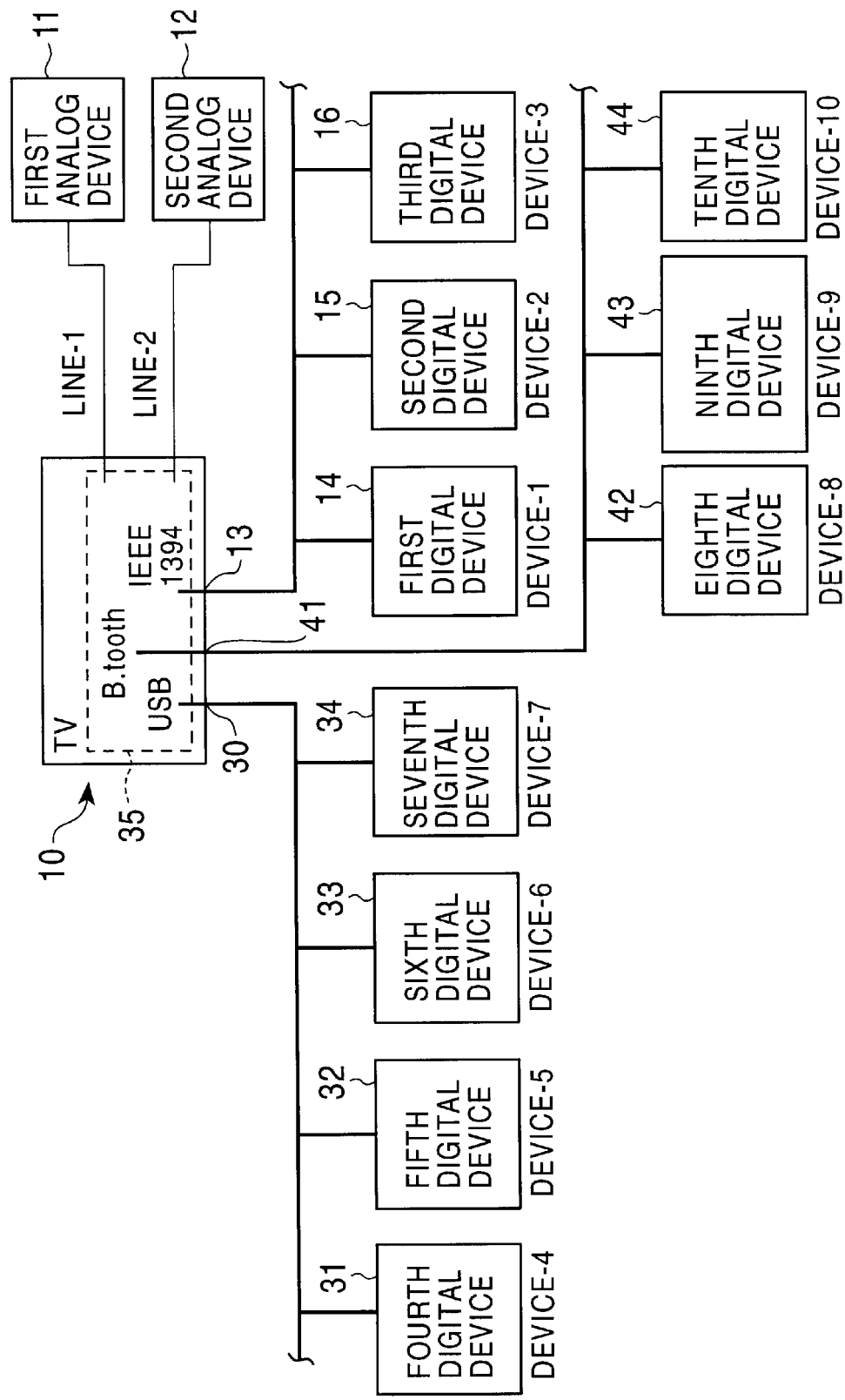
FIG. 15 is a block diagram showing the connection configuration of the electronic equipment realizing the selection method of an eighth embodiment according to the present invention.

In the configuration of the electronic equipment realizing the selection method of the devices connected with the electronic equipment according to the eighth embodiment, a television receiver as the electronic equipment is equipped with a plurality of input/output terminals for the connection with the devices through digital buses or by radio transmission, and has a function of connecting the selected devices connected with the input/output terminals with each other. In the configuration, the television receiver 10, as shown in FIG. 15, includes an equipment control section 35 having a function of connecting a plurality of input/output terminals with devices, and a function of specifying a device from which signals are input and a device to which signals are output.

It is possible to connect devices having different protocols with the plural input/output terminals in physically different forms. In the configuration, as shown in FIG. 15, a first analog device (VTR, for example) 11 is connected with the input/output terminal Line-1 to be connected with a device for analog signals; a second analog device (LDP, for example) 12 is connected with the input/output terminal Line-2 to be connected with a device for analog signals; a first digital device (VCR, for example) 14 is connected with the input/output terminal "1394 " to be connected with the digital signal devices connected with a digital bus 13 conforming to the IEEE standards 1394 as a Device-1 in a daisy-chained way; a second digital device (HDD, for example) 15 is connected with the input/output terminal "1394" as a Device-2 in the daisy-chained way; and a third digital device (DVD, for example) 16 is connected with the input/output terminal "1394 " as a Device-3 in the daisy-chained way.

Moreover, a fourth digital device (a memory card such as a memory stick (registered trademark), for example) 31 is connected with an input/output terminal "USB" to be connected with a digital bus 30 conforming to the Universal Serial Bus (USB) standards as a Device-4; a fifth digital device (a still camera, for example) 32 is connected with the input/output terminal "USB" as a Device-5; a sixth digital device (a scanner, for example) 33 is connected with the input/output terminal "USB" as a Device-6; and a seventh digital device (a video camera, for example) 34 is connected with the input/output terminal "USB" as a Device-7.

To a radio transmission input/output terminal (B. tooth) to which devices having a radio transmission function designed so that radio waves in, for example, 2.4 GHz band travel within a range of several tens of meters, for example, a bus 41 conforming to IEEE standards 802.15 WPAN (Working Group for Wireless Personal Area Network; brand name: Bluetooth), can be connected, an eighth digital device (a printer, for example) 42 is connected as a Device-8; a ninth digital device (a telephone, for example) 43 is connected as a Device-9; and a tenth digital device (a digital camera, for example) 44 is connected as a Device-10.

Figure 16:
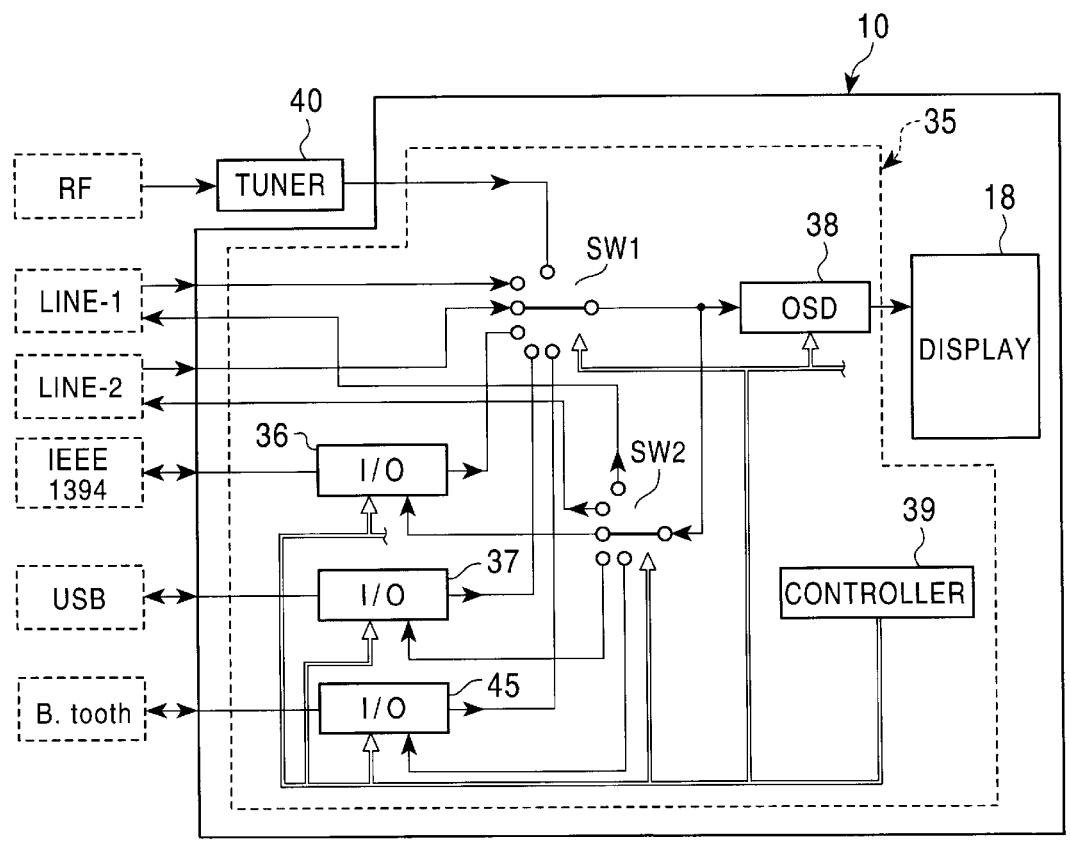
FIG. 16 is a schematic connection diagram showing the equipment control section for connecting the devices shown in FIG. 15.

The equipment control section 35, as shown in FIG. 16, includes an input-switching switch SW1 for switching input side terminals among the plural input/output terminals physically, an output-switching switch SW2 for switching output side terminals among the input/output terminals physically, a first I/O section 36 for switching logically the devices connected with the input/output terminal "1394" conforming to the IEEE 1394 standards, a second I/O section 37 for switching logically the devices connected with the input/output terminal "USB" conforming to the USB standards, a third I/O section 45 for switching logically the devices connected with the input/output terminal "B. tooth" to be connected with a bus connectable with devices having radio transmission, and a controller 39 for controlling these switches SW1, SW2, I/O sections 36, 37, 45 and a superimposition display section (OSD) 38. Incidentally, the input-switching switch SW1 is configured to have a terminal to be connected with a tuner 40. In this context, the "tuner 40" includes the whole receivable broadcasting, for example, Communication Satellite (CS) broadcasting, Broadcasting Satellite (BS) broadcasting, and ground wave broadcasting.

In the thus configured equipment control section 35, the controller 39 controls the connection of the physical terminals through the switches SW1, SW2 in accordance with a device selected on the menu displayed on the display 18 in a superimposed way, and connects devices with each other by connecting input/output terminals corresponding to the devices by means of the logical operations of the I/O sections 36, 37, 45. Or, the switches SW1, SW2 can be used when specifying a device to which signals are output and specifying a device from which signals are input. That is, by the control of the switch SW2 while the switch SW1 is connected with the terminal of a specific device, it becomes possible to transmit the data from the specific device to a designated device.

Figure 17:
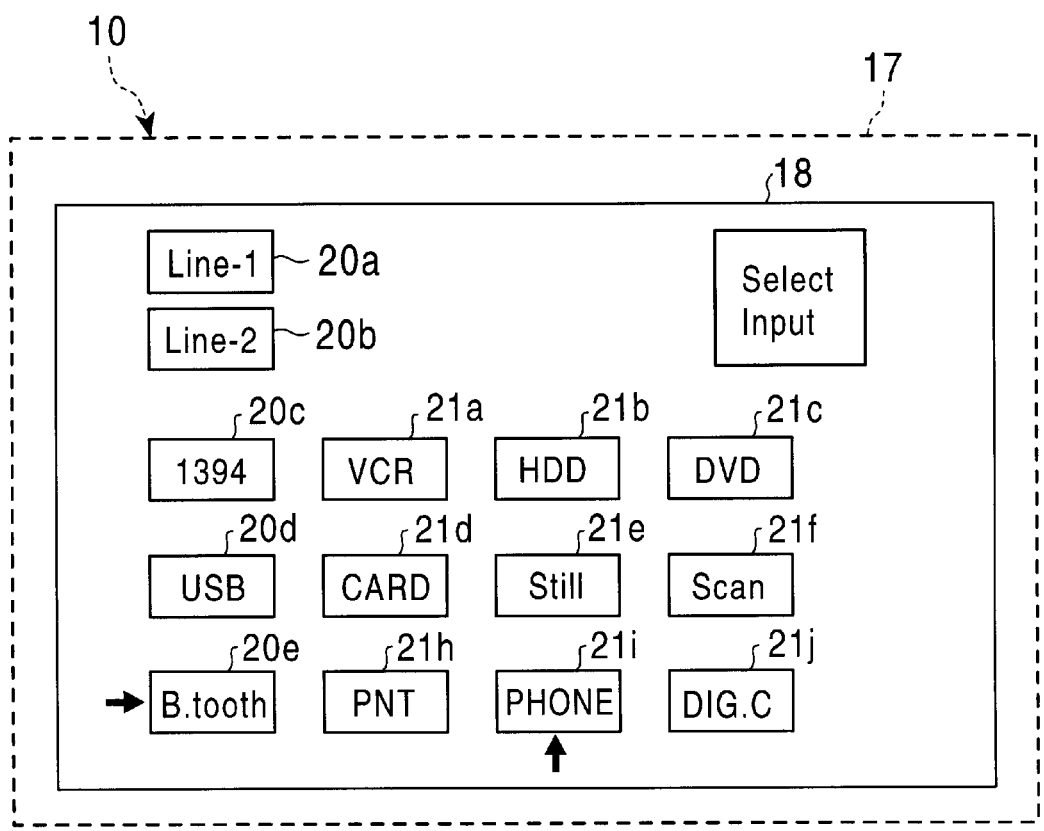
FIG. 17 is an explanatory view showing a menu screen in which devices capable of being physically connected are shown in an ordinate axis direction and devices capable of being logically discriminated are shown in abscissa axis directions in the connection configuration of the electronic equipment realizing the eighth embodiment.

For selecting a device displayed in the superimposed way (OSD) in the thus configured television receiver 10, a user, at first, as shown in FIG. 17, selects a desired device among the graphic items 20a, 20b, 21a–21c, 21d–21f and 21h–21j representing respectively the connected devices 11, 12, 14–16, 31–33 and 42–44 while observing a menu 18 displayed on the screen 17 of the television receiver 10 in a superimposed way. In the screen display of the menu 18, there are included the graphic items 20a–20e arranged in an ordinate axis direction, which are indicative of the plural physically discriminable devices 11, 12, digital buses 13, 30 and a bus 41, and the graphic items 21a–21f, 21h–21j arranged in abscissa axis directions, which are indicative of the devices 14–16, 31–33, 42–44 connected with the input/output terminal of the IEEE standards 1394, the input/output terminal of the USB standards, and the radio transmission input/output terminal, respectively, and the connection states of which can logically be discriminated.

The user selects the devices 11, 12 and 14–16, 31–32, 42–44 by selecting any one of the graphic items 20a–20e and 21a–21f, 21h–21j displayed in the ordinate axis direction and the abscissa axis directions, respectively.

Incidentally, the input/output terminals Line-1, Line-2 to be connected with the devices for analog signals and the input/output terminals "1394", "USB", "B. tooth" to be connected with the digital devices connected with the digital buses 13, 30 and a bus 41 are all included in the plural physically connectable input/output terminals.

The physically connectable devices 11, 12 represented by the graphic items 20a, 20b that are displayed in the ordinate axis direction are designated in the menu 18 by the input/output terminals Line-1 (20a: the first analog device 11), Line-2 (20b: the second analog device 12). The digital bus 13 conforms to a protocol conforming to the IEEE standards and is indicated by the graphic item "1394" (20c). The digital bus 30 conforms to the USB standards having master/slave relations and is indicated by the graphic item "USB" (20d). The bus 41 has a function for the connection of the devices equipped with a radio transmission function represented by the brand name of Bluetooth conforming to the IEEE standards 802.15 and is indicated by the graphic item "B. tooth" (20e).

The graphic item VCR (21a) corresponding to the first digital device 14, the graphic item HDD (21b) corresponding to the second digital device 15, and the graphic item DVD (21c) corresponding to the third digital device 16 are displayed as the logically discriminable devices that are connected with the digital bus 13 conforming to the IEEE standards 1394 and are displayed in an abscissa axis direction.

The graphic item CARD (21d) corresponding to the fourth digital device 31, the graphic item Still 21e) corresponding to the fifth digital device 32, and the graphic item Scan (21f) corresponding to the sixth digital device 33 are displayed as the logically discriminable devices that are connected with the digital bus 30 conforming to the USB standards and are displayed in an abscissa axis direction.

A graphic item PNT (21h) indicative of a printer corresponding to the eighth digital device 42, a graphic item PHONE (21i) indicative of a telephone such as a cellular phone corresponding to the ninth digital device 43, and a graphic item DIG. C (21j) indicative of a digital camera corresponding to the tenth digital device 44 are displayed as the logically discriminable devices that are displayed in an abscissa axis direction and are connected with the bus 41 to which devices having a function of radio transmission are connected.

In the case where the devices 11, 12, 14–16, 31–33, 42–44, the digital buses 13, 30 and the bus 41 are displayed as the graphic items 20a–20e, 21a–21f, 21h–21j in the ordinate axis direction and the abscissa axis directions, the user first selects one of the graphic items 20a–20e (devices 11, 12, digital buses 13, 30 and bus 41) displayed in the ordinate axis direction. In the case of the embodiment shown in FIG. 17, the graphic item 20e (B. tooth) pointed out by the cursor is selected.

Next, in the case where the user selects one of the devices 14–16, 31–33, 42–44 (that is, the graphic items 21a–21f, 21h–21j displayed in the abscissa axis directions), the user selects one of the graphic items 21h–21j displayed in the abscissa axis direction adjoining the graphic item 20e of the devices 42–44 as a desired device, the "PHONE" (21i) in the embodiment shown in FIG. 17, and then the telephone such as a cellular phone is selected.

Such a variation of the graphic items 20a–20e and 21a–21f, 21h–21j into the ordinate axis direction and the abscissa axis directions, respectively, so as to correspond to the connection state of the devices 11, 12, 14–16, 31–33, 42–44 and the digital buses 13, 30 and the bus 41 makes it possible to make the discrimination of the connection states of the devices 11, 12, 14–16, 31–33, 42–44 very simply and easily.

Next, an embodiment, in which devices connected with the electronic equipment are connected to each other, is described. The devices are connected with each other by the control of the switches SW1, SW2 of the equipment control section 35 shown in FIG. 16.

Figure 18:
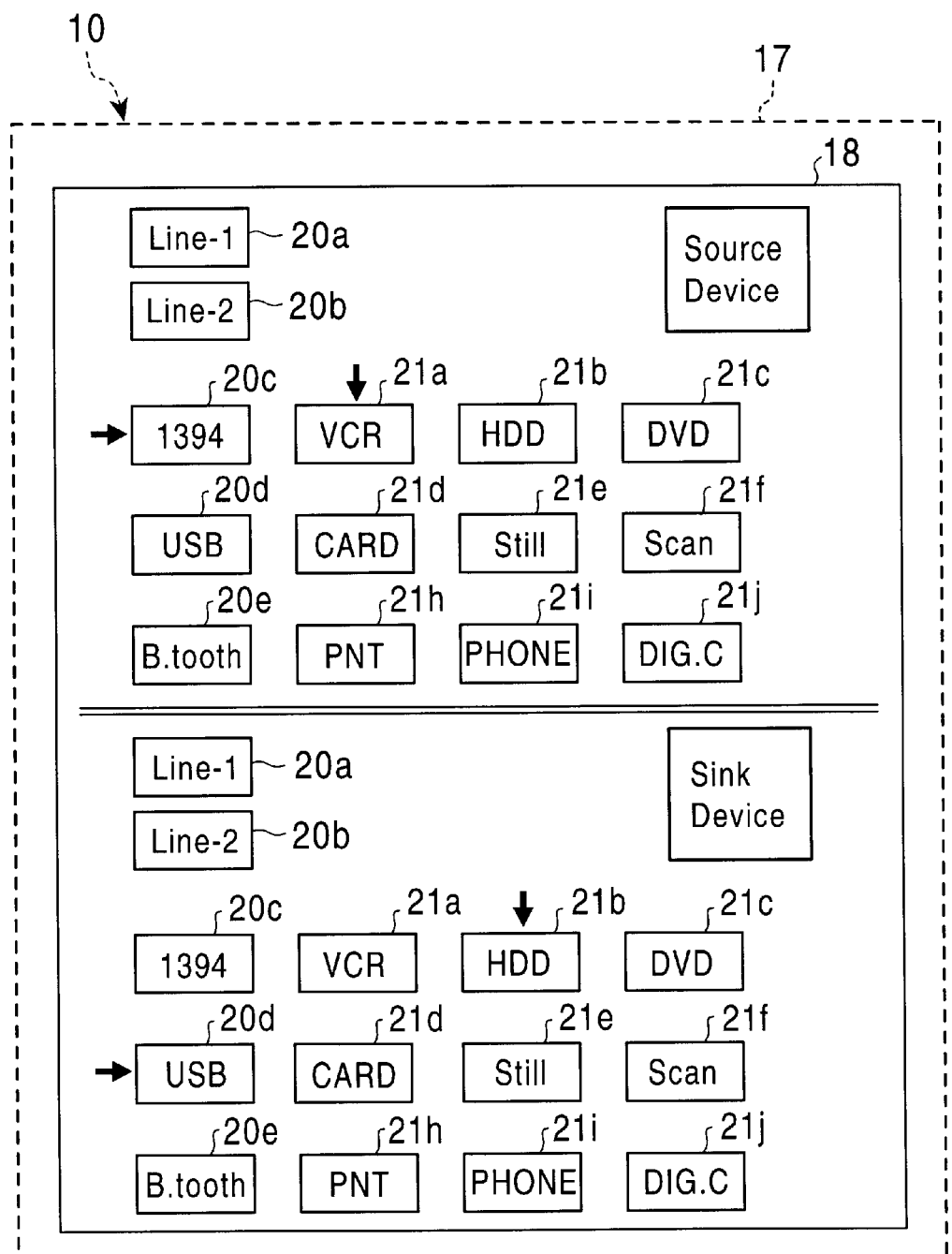
FIG. 18 is an explanatory view showing a menu screen of the electronic equipment realizing the eighth embodiment for connecting respective devices.

At first, for performing the connection between the devices, a user selects a device in a menu 18 displayed on a television receiver 10 in a superimposed way (OSD) as shown in FIG. 18. That is, the user observes the menu 18 displayed on the screen 17 of the television receiver 10 in a superimposed way while the user selects a desired device among the devices 11, 12, 14–16, 31–33, 42–44.

In the screen display of the menu 18, there are displayed a menu of source devices (Source Device) for the selection of the devices on the source side, and a menu of sink devices (Sink Device) for the selection of the devices on the destination side. The display modes of both of the menus are the same.

The menu of the source devices and the menu of the sink devices are constituted of the graphic items 20a–20e, which are arranged in the ordinate axis direction and represent the plural physically discriminable devices 11, 12, the digital buses 13, 30 and the bus 41, and the graphic items 21a–21f, 21h–21j which are arranged in the abscissa axis directions and represent the devices 14–16, 31–33, 42–44 which are connected with the input/output terminals "1394", "USB", "B. tooth", respectively, and the connection state of which can logically be discriminated.

The user selects the devices 11, 12, 14–16, 31–33, 42–44 by selecting any one of the graphic items 20a–20e and 21a–21f, 21h–21j displayed in the ordinate axis direction and the abscissa axis directions.

When the graphic items 20a–20e, 21a–21f, 21h–21j representing the devices 11, 12, 14–16, 31–33, 42–44, the digital buses 13, 30 and the bus 41 are displayed in the ordinate axis direction and the abscissa axis directions as the menus of the source devices and the sink devices, the user, at first, selects one of the graphic items 20a–20e (the devices 11, 12, the digital buses 13, 30 and the bus 41) displayed in the ordinate axis direction on the source device side. In the present embodiment, the user has selected the graphic item 20c (input/output terminal "1394") by pointing it with the cursor.

Next, when the user selects one of the graphic items 21a–21c, 21d–21f, 21h–21j displayed in the abscissa axis directions representing the devices 14–16, 31–33, 42–44, respectively, the user selects a desired device among the graphic items 21a–21c displayed in the abscissa axis direction adjoining the graphic item 20c, e.g. the graphic item 21a ("VCR") in the present embodiment shown in FIG. 18, and then the video cassette recorder is selected.

Next, the user selects a device on the destination side in the menu on the sink device side. When the graphic items 20a–20e, 21a–21f, 21h–21j in the ordinate axis direction and the abscissa axis directions representing the devices 11, 12, 14–16, 31–33, 42–44, the digital buses 13, 30 and the bus 41, the user first selects a graphic item among the graphic items 20a–20e representing the devices 11, 12, the digital buses 13, 30 and the bus 41 in the ordinate axis direction on the sink device side. In the present embodiment shown in FIG. 18, the user selects the graphic item 20d ("USB") with the cursor.

Next, when the user selects one of the graphic items 21a–21c, 21d–21f, 21h–21j displayed in the abscissa axis directions and representing the devices 14–16, 31–33, 42–44, respectively, the user selects a desired device among the graphic items 21d–21f displayed in the abscissa axis direction adjoining the graphic item 20d, e.g. the graphic item 21e ("Video") in the present embodiment shown in FIG. 18, and then the video camera is selected.

The user has thus selected the "VCR" connected with the device 13 conforming the IEEE standards 1394 on the source device side in the menu 18, and has selected the "Video" connected with the digital bus 30 conforming to the USB standards on the sink device side in the menu 18. Then, the "VCR" and the "Video" become connectable to each other as the connectable devices. Consequently, the transmission and the reception of data between the connectable devices can be performed in conformity with not shown operations.

Next, the attached drawings are referred while the electronic equipment realizing a selection method of the devices connected with the electronic equipment according to a ninth embodiment is described. A displayed menu for the selection of a device among the devices connected with the electronic equipment in the ninth embodiment is configured so that graphic items representing the devices capable of being physically connected and graphic items representing the digital buses and the bus for connecting devices having a function of radio transmission are displayed in an abscissa axis direction and graphic items capable of being logically discriminated are displayed in ordinate axis directions.

The configuration for realizing the selection method of devices connected with the electronic equipment according to the ninth embodiment is the same as that of eighth embodiment shown in FIGS. 15 and 16. In the configuration, the television receiver 10 as the electronic equipment includes a plurality of input/output terminals and the equipment control section 35 for controlling the connection between the devices. The television receiver 10 is equipped with physical input/output terminals for a digital bus conforming to the IEEE standards 1394, a digital bus conforming to the USB standards, and a bus for connecting devices having a function of radio transmission. The logical display forms of the input/output terminals having the physical forms can be displayed on the television receiver 10. Because the connection form in the configuration is the same as that shown in FIGS. 15 and 16, the description thereof is omitted.

Figure 19:
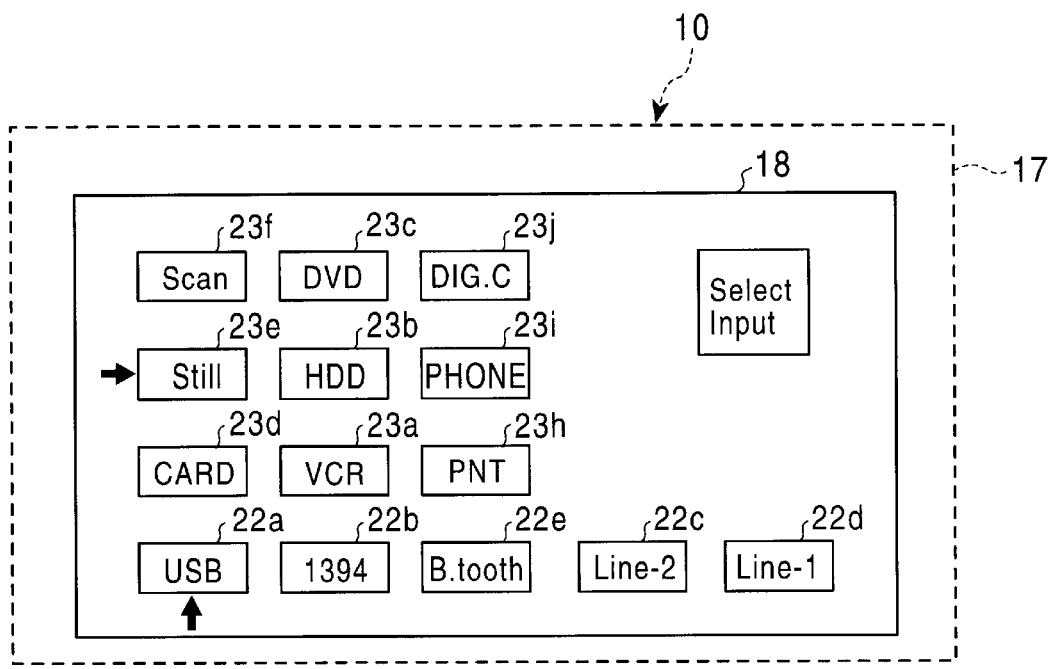
FIG. 19 is an explanatory view showing a menu screen in which devices capable of being physically connected are shown in an abscissa axis direction and devices capable of being logically discriminated are shown in ordinate axis directions in the connection configuration of the electronic equipment realizing the selection method of a ninth embodiment according to the present invention.

For selecting a device displayed in the superimposed way (OSD) in the thus configured television receiver 10, a user, at first, as shown in FIG. 19, selects a desired device among the graphic items 22a–22e, 23a–23f, 23h–23j representing the devices 11, 12, 14–16, 31–33, 42–44, the digital buses 13, 30 and the bus 41 while observing a menu 18 displayed on the screen 17 of the television receiver 10 in a superimposed way. In the screen display of the menu 18, there are included the graphic items 22a–22e, which represent a plurality of physically discriminable devices 11, 12, the digital buses 13, 30 and the bus 41 and are arranged in an abscissa axis direction, and the graphic items 23a–23f, 23h–23j which are arranged in ordinate axis directions and represent the devices 14–16, 31–33, 42–44 connected with the input/output terminal "1394" of the IEEE standards 1394, the input/output terminal "USB" of the USB standards and the input/output terminal "B. tooth" for radio transmission, respectively, and the connection states of which can logically be discriminated. The user selects one of the devices 14–16, 31–33, 42–44 by selecting any one of the graphic items 22a–22e arranged in the abscissa axis direction together with the graphic items 23a–23f, 23h–23j arranged in the ordinate axis directions.

In the case where the devices 11, 12, 14–16, 31–33, 42–44, the digital buses 13, 30 and the bus 41 are displayed as the graphic items 22a–22e, 23a–23f, 23h–23j in the ordinate axis directions and the abscissa axis direction, the user first selects one of the graphic items 22a–22e (the devices 11, 12, the digital buses 13, 30 and the bus 41) displayed in the abscissa axis direction. In the case of the embodiment shown in FIG. 19, the graphic item 22a (USB) pointed out by the cursor is selected.

Next, in the case where the user selects one of the devices 14–16, 31–33, 42–44 (the graphic items 23a–23f, 23h–23j displayed in the ordinate axis directions), the user selects one of the graphic items 23d–23f of the devices 31–33 arranged in the ordinate axis direction adjoining the graphic item 22a as a desired device, the graphic item 23e ("Still") indicative of the device 32 in the present embodiment, and then the still camera is selected.

Such alterations of the graphic items 22a–22e, 23a–23f, 23h–23j into the ordinate axis directions and the abscissa axis direction so as to correspond to the connection states of the devices 11, 12, 14–16, 31–33, 42–44 make it possible to make the discrimination of the connection states of the devices 11, 12, 14–16, 31–33, 42–44 very simply and easily.

Figure 20:
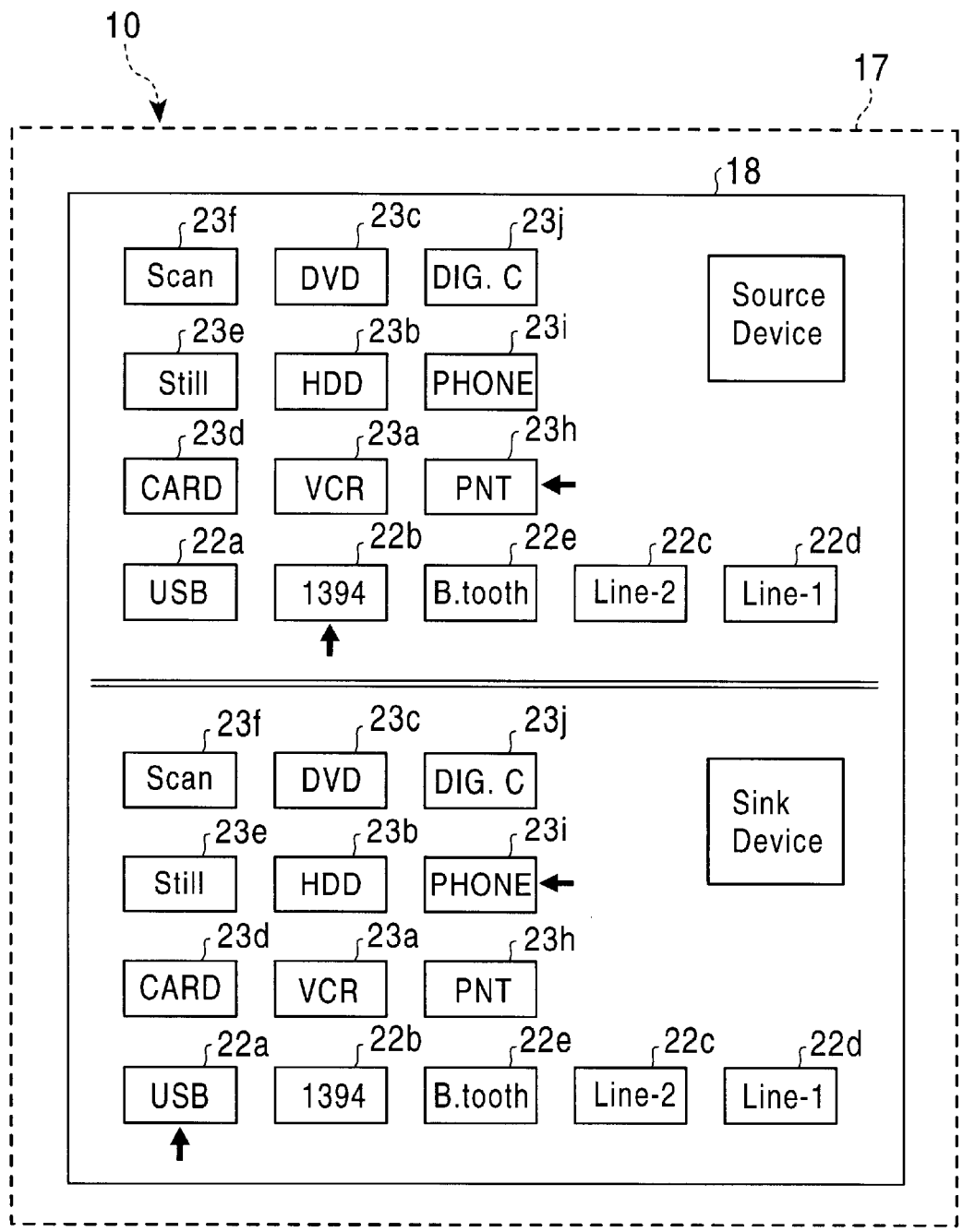
FIG. 20 is an explanatory view showing a menu screen of the electronic equipment of the ninth embodiment for connecting respective devices.

Next, description is given to an embodiment for the connection between the aforesaid connected devices. The connection between the devices is performed by the control of the switches SW1, SW2 of the equipment control section 35 shown in FIG. 16. At first, for performing the connection between the devices, a user selects devices by means of a menu 18 displayed on a television receiver 10 in a superimposed way (OSD) as shown in FIG. 20. On this selection, the user observes the menu 18 displayed on the screen 17 of the television receiver 10 in the superimposed way while the user selects desired devices from the devices 11, 12, 14–16, 31–33, 42–44 and the digital buses 13, 30 and the bus 41. The screen display of the menu 18 is constituted of a source device menu for the selection of the devices and buses on the source side and a sink device menu for the selection of the devices and buses on the destination side, and the display mode of the source device menu and the sink device menu are the same.

The source device menu and the sink device menu are composed of the graphic items 22a–22e displayed in the abscissa axis direction and representing the plural physically discriminable devices 11, 12 the digital buses 13, 30 and the bus 41, and the graphic items 23a–23f, 23h–23j displayed in the ordinate axis directions and representing the devices 14–16, 31–33, 42–44, which are connected with the input/output terminals conforming the IEEE standards and the USB standards and the bus for radio transmission, respectively, and the connection states of which can logically be discriminated. The user selects any one of the devices 11, 12, 14–16, 31–33, 42–44 by selecting one of the graphic items 22a–22e, 23a–23f, 23h–23j arranged in the ordinate axis directions and the abscissa axis direction.

When the graphic items 22a–22e, 23a–23f, 23h–23j representing the devices 11, 12, 14–16, 31–33, 42–44, the digital buses 13, 30 and the bus 41 are displayed in the ordinate axis directions and the abscissa axis direction as the menus of the source devices and the sink devices, a user, at first, selects one of the graphic items 22a–22e indicative of the devices 11, 12, the digital buses 13, 30, the bus 41 displayed in the abscissa axis direction on the source device side. In the present embodiment, the user has selected the graphic item 22b, "1394 ", by pointing it out with the cursor.

Next, in the case where the user selects the devices 14–16, 31–33, 42–44, the graphic items of which 23a–23f, 23h–23j are displayed in the ordinate axis directions, the user selects one of the graphic items 23a–23c displayed in the ordinate axis direction adjoining the graphic item 22b and representing the devices 14–16. When the user selects the graphic item 23a ("VCR") representing the first digital device 14 in the present embodiment, the video cassette recorder is selected.

Next, the user selects a device on the destination side in the menu on the sink device side. When the graphic items 22a–22e, 23a–23f, 23h–23j representing the devices 11, 12, 14–16, 31–33, 42–44 the digital buses 13, 30 and the bus 41 are displayed in the abscissa axis direction and in the ordinate directions, the user first selects a graphic item among the graphic items 22a–22e representing the devices 11, 12, the digital buses 13, 30 and the bus 41 in the abscissa axis direction on the sink device side. In the present embodiment, the user selects the graphic item 22a ("USB") with the cursor.

Next, when the user selects one of the graphic items 23a–23f, 23h–23j displayed in the ordinate axis directions representing the devices 14–16, 31–33, 42–44, the user selects a desired device among the graphic items 23d–23f displayed in the ordinate axis direction adjoining the graphic item 22a, the graphic item 23e ("Still") in the embodiment shown in the FIG. 20, for example, and then the still camera is selected.

The user thus selects the "VCR" connected with the digital bus 13 conforming the IEEE standards 1394 on the source device side in the menu 18, and selects the "Still" connected with the digital bus 30 conforming the USB standards on the sink device side in the menu 18. Then, the "VCR" and the "Still" become connectable to each other as the connectable devices. Consequently, the transmission and reception of data between the connectable devices can be performed in conformity with not shown operations.

Next, the attached drawings are referred while a piece of electronic equipment realizing a selection method of the devices connected with the electronic equipment according to a tenth embodiment is described.

The configuration for realizing the selection method of the devices connected with the electronic equipment of the tenth embodiment includes an apparatus having a display such as a television receiver and a device controller equipped with a plurality of input/output terminals and having a function of connecting selected devices connected with the input/output terminals with each other. The device controller is, for example, a receiver such as an AV selector equipped with an audio tuner, a line selector, a set top box (STB), or the like.

Figure 21:
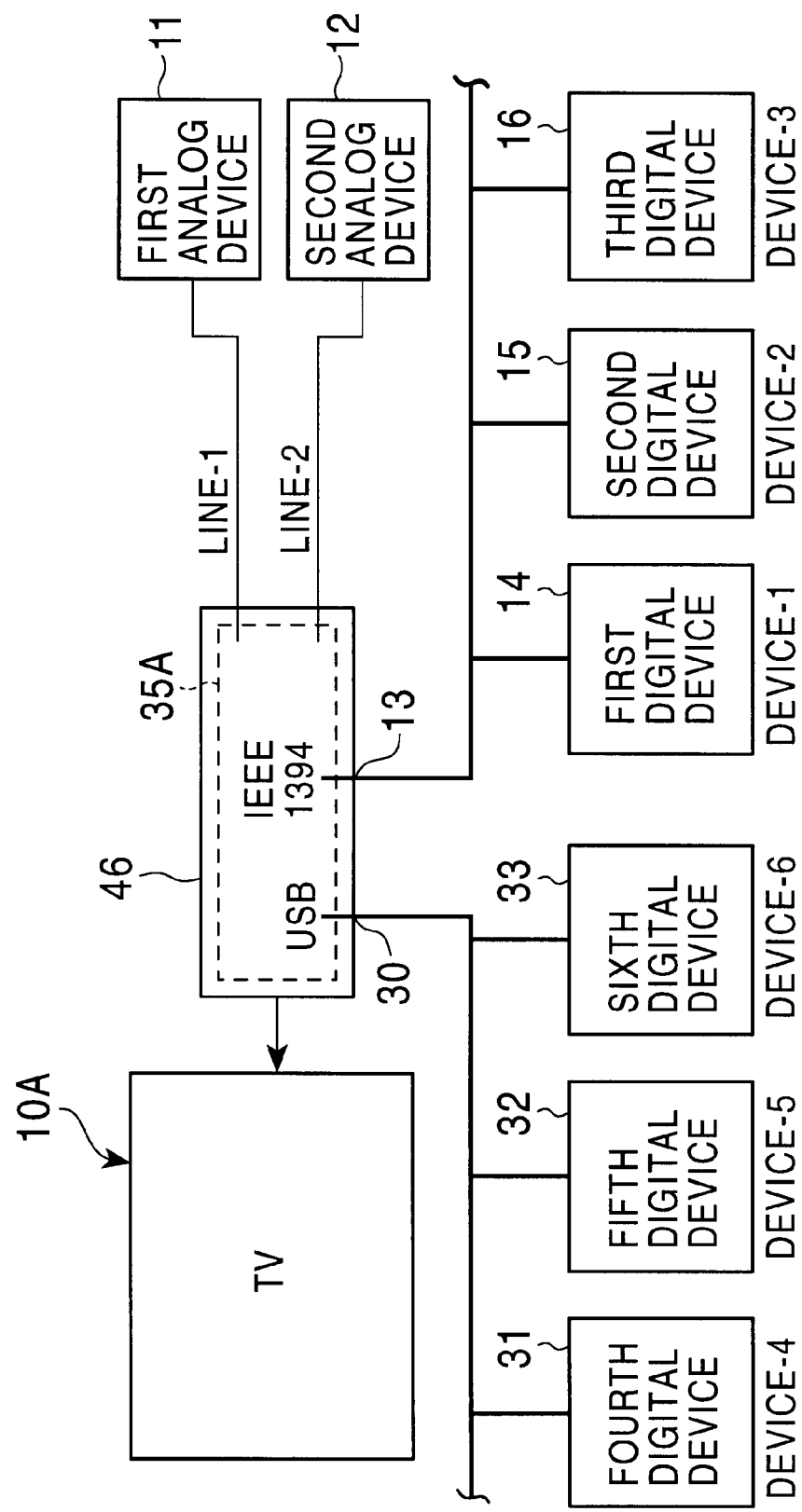
FIG. 21 is a block diagram showing the connection configuration of the electronic equipment realizing the selection method of a tenth embodiment according to the present invention, in which a television receiver is used as a display and the control of devices is performed by a device controller.

The device controller 46 can be connected with a television receiver 10A as shown in FIG. 21. The device controller 46 besides includes an equipment control section 35A for connecting a plurality of input/output terminals with devices.

It is possible to connect devices having different protocols with the plural input/output terminals in physically different forms. The input/output terminals are composed of input/output terminals to be connected with devices for analog signals and input/output terminals to be connected with digital buses.

A first analog device (VTR, for example) 11 is connected with the input/output terminal Line-1 to be connected with a device for analog signals, and a second analog device (LDP, for example) 12 is connected with the input/output terminal Line-2 to be connected with a device for analog signals.

A first digital device (VCR, for example) 14 is connected with an input/output terminal "1394" to be connected with the digital signal devices connected with a digital bus 13 conforming to the IEEE standards 1394 as a Device-1 in a daisy-chained way, and a second digital device (HDD, for example) 15 is connected with the input/output terminal "1394" as a Device-2 in a daisy-chained way, and further a third digital device (DVD, for example) 16 is connected with the input/output terminal "1394" as a Device-3 in a daisy-chained way.

A fourth digital device (a memory card, for example) 31 is connected with an input/output terminal "USB" to be connected with a digital bus 30 conforming to the Universal Serial Bus (USB) standards as a Device-4, and a fifth digital device (a still camera, for example) 32 is connected with the input/output terminal "USB" as a Device-5, and further a sixth digital device (a scanner, for example) 33 is connected with the input/output terminal "USB" as a Device-6.

Figure 22:
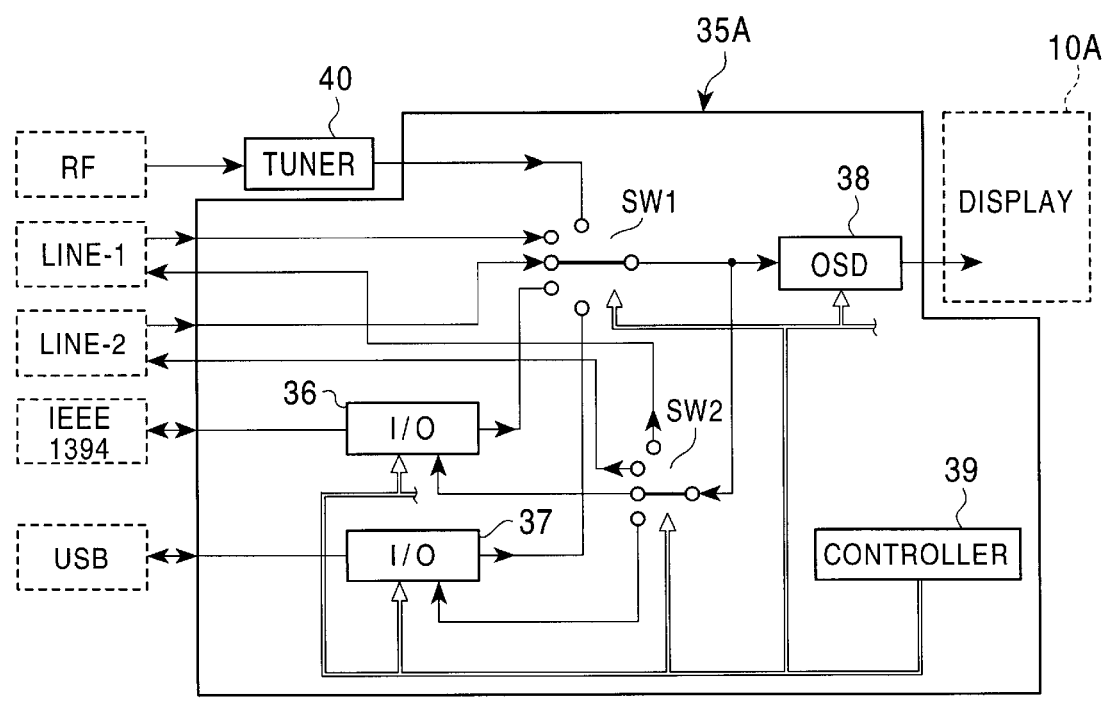
FIG. 22 is a schematic connection diagram showing the equipment control section for connecting the devices shown in FIG. 21.

As shown in FIG. 22, the equipment control section 35A includes an input-switching switch SW1 for switching physically input side terminals among the plural input/output terminals, an output-switching switch SW2 for switching physically output side terminals among the input/output terminals, a first I/O section 36 for switching logically the devices connected with the input/output terminal "1394" conforming to the IEEE 1394 standards, a second I/O section 37 for switching logically the devices connected with the input/output terminal "USB" conforming to the USB standards, and a controller 39 for controlling these switches SW1, SW2, I/O sections 36, 37 and a superimposition display section (OSD) 38. Incidentally, the input-switching switch SW1 is configured to be connectable with a tuner 40 and the input/output terminals. In this context, the "tuner 40" includes all of the broadcasting receivers that can receive such as Communication Satellite (CS) broadcasting, Broadcasting Satellite (BS) broadcasting, and ground wave broadcasting.

In the thus configured equipment control section 35A, the controller 39 controls the switches SW1, SW2 to connect the physical input/output terminals with devices on the basis of the operation of a user who observes the menu displayed on the display of the television receiver 10A in a superimposed way, and connects devices with each other by connecting input/output terminals corresponding to the devices by means of the logical operations of the I/O sections 36, 37. Or, the switches SW1, SW2 are usable for the selection of the devices for outputting signals. That is, the data from a specific device can be linked with a designated device by the control of the switch SW2 while the switch SW1 is connected with an input/output terminal connected with a specific device.

The menu displayed on the television receiver 10A in a superimposed way (OSD) by the control of the thus configured device controller 46 can be displayed in the same display mode as that shown in FIG. 9 concerning the fifth embodiment. To describe it simply, the screen display of the menu 18 includes graphic items 20a–20d arranged in an ordinate axis direction and representing the plural physically discriminable devices 11–12, and the digital buses 13, 30, and the graphic items 21a–21g arranged in the abscissa axis directions and representing the devices 14–16, 31–34, connected with the input/output terminals "1394", "USB", the connection states of which can be discriminated.

In the case where the devices 11, 12, 14–16, 31–34 and the digital buses 13, 30 are displayed as the graphic items 20a–20d, 21a–21g in the ordinate axis direction and the abscissa axis directions, the user first selects one of the graphic items 20a–20d (devices 11, 12, digital buses 13, 30) displayed in the ordinate axis direction. In the case of the present embodiment shown in FIG. 9, the graphic item 20d (USB) pointed out by the cursor is selected.

Next, in the case where the user selects one of the devices 14–16, 31–34 (that is, the graphic items 21a–21g displayed in the abscissa axis directions), the user selects one of the graphic items 21d–21g displayed in the abscissa axis direction adjoining the graphic item 20d and representing the devices 31–34 as a desired device, the "Still" (21e) in the present embodiment shown in FIG. 9, and then the still camera is selected.

Such alterations of the graphic items 20a–20d and 21a–21g into the ordinate axis direction and the abscissa axis directions so as to correspond to the connection states of the devices 11, 12, 14–16, 31–34 makes it possible to make the discrimination of the connection states of the devices 11, 12, 14–16, 31–34 very simply and easily.

Next, an embodiment, in which devices connected with the electronic equipment are connected to each other, is described. The devices are connected with each other by the control of the switches SW1, SW2 of the equipment control section 35A shown in FIG. 22. Because the display mode of the screen of the menu for performing the connection between devices is the same as the display mode shown in FIG. 10 concerning the fifth embodiment, the description thereof is simply given.

The menu of source devices and the menu of sink devices are constituted of the graphic items 20a–20d, which are arranged in the ordinate axis direction and represent the plural physically discriminable device 11, 12 and the digital buses 13, 30, and graphic items 21a–21f, which are arranged in the abscissa axis directions and represent the devices 14–16 and 31–33, which are connected with the input/output terminals "1394", "USB" and the connection states of which can logically be discriminated. Incidentally, the logical connection form of the physically connected devices displayed in the abscissa axis direction adjoining the graphic item 30d ("USB") is limited up to the graphic item 21f representing the sixth digital device 33 in the case of the present embodiment, although there are depicted up to seventh device in FIG. 10.

When the graphic items 20a–20d, 21a–21f representing the devices 11, 12, 14–16, 31–33 and the digital buses 13, 30 are displayed in the ordinate axis direction and the abscissa axis directions as the menus of the source devices and the sink devices, a user, at first, selects one of the graphic items 20a–20d indicative of the devices 11, 12, and the digital buses 13, 30, displayed in the ordinate axis direction on the source device side. In the present embodiment, the user selects the graphic item 20c (1394) by pointing it with the cursor.

Next, when the user selects one of the graphic items 21a–21c, 21d–21f displayed in the abscissa axis directions corresponding to the devices 14–16, 31–33, respectively, the user selects a desired device among the graphic items 21a–21c displayed in the abscissa axis direction adjoining the graphic item 20c, e.g. the graphic item 21a ("VCR") in the embodiment shown in the FIG. 10, and then the video cassette recorder is selected.

Next, the user selects a device on the destination side in the menu on the sink device side. When the graphic items 20a–20d, 21a–21f are displayed in the ordinate axis direction and the abscissa axis direction, representing the devices 11, 12, 14–16, 31–33 and the digital buses 13, 30, the user first selects one from the graphic item 20a–20d representing the devices 11, 12 and the digital buses 13, 30 in the ordinate axis direction among the graphic items on the sink device side. In the present embodiment shown in FIG. 10, the user selects the graphic item 20c ("1394") with the cursor.

Next, when the user selects one of the graphic items 21a–21c, 21d–21f displayed in the abscissa axis directions and representing the devices 14–16, 31–33, respectively, the user selects a desired device among the graphic items 21a–21c displayed in the abscissa axis direction adjoining the graphic item 20c, the graphic item 21b ("HDD") in the present embodiment shown in the FIG. 10, for example, and then the hard disk drive is selected.

The user thus selects the "VCR" connected with the digital bus 13 conforming the IEEE standards 1394 on the source device side in the menu 18, and selects the "HDD" connected with the digital bus 13 on the sink device side in the menu 18. Then, the "VCR" and the "HDD" become connectable to each other as the connectable devices. Consequently, the transmission and reception of data between the connectable devices can be performed in conformity with not shown operations.

Next, a description is given to the display of a menu having a display mode exchanged with the aforesaid forms. That is, physical devices are displayed in an abscissa axis direction and logical devices are displayed in ordinate axis directions. The display mode is the same as that shown in FIG. 11 concerning the sixth embodiment. In the present embodiment, the connection form of the logical devices to the bus conforming to the USB standards is limited up to the sixth device.

To describe simply the menu displayed in a superimposed way, in the case where the devices 11, 12, 14–16, 31–33 and the digital buses 13, 30 are displayed as the graphic items 22a–22d, 23a–23f in the ordinate axis directions and the abscissa axis direction, the user first selects one of the graphic items 22a–22d (that is, the devices 11, 12, and the digital buses 13, 30) displayed in the abscissa axis direction. In the case of the embodiment shown in FIG. 11, the graphic item 22a (USB) indicated by the cursor is selected.

Next, in the case where the user selects one of the devices 14–16, 31–33 (that is, the graphic items 23a–23f displayed in the ordinate axis directions), the user selects one of the graphic items 23d–23f representing the devices 31–33 arranged in the ordinate axis direction adjoining the graphic item 22a as a desired device, the graphic item 23e ("Still") in the present embodiment shown in FIG. 11, and then the still camera is selected.

Such variations of the graphic items 22a–22d, 23a–23f into the ordinate axis directions and the abscissa axis direction so as to correspond to the connection states of the devices 11, 12, 14–16, 31–33 and the digital buses 13, 30 makes it possible to make the discrimination of the connection states of the devices 11, 12, 14–16, 31–34 very simply and easily.

Next, the superimposed menu for the selection of the connected devices to be connected with each other is the same as that shown in FIG. 12 concerning the sixth embodiment. Only one point is different from the menu shown in FIG. 12. That is, the logical devices connected with the digital bus 30 conforming to the USB standards for physical connections are limited up to the sixth device in the menu of the present embodiment.

The menu displayed in a superimposed way in the aforesaid display mode is simply described in the following. That is, in the case where the graphic items 22a–22d, 23a–23f representing the devices 11, 12, 14–16, 31–33 and the digital buses 13, 30 are displayed in the ordinate axis directions and the abscissa axis direction as the menus of the source devices and the sink devices, a user, at first, selects one of the graphic items 22a–22d (devices 11, 12, digital buses 13, 30) displayed in the abscissa axis direction on the source device side. In the present embodiment shown in FIG. 12, the user selects the graphic item 22a ("USB") by pointing it out with the cursor.

Next, when the user selects one of the graphic items 23a–23f displayed in the ordinate axis directions representing the devices 14–16, 31–33, the user selects a desired device among the graphic items 23e–23f arranged in the ordinate axis adjoining the graphic item 22a, e.g. the graphic item 23d ("CARD"), and then the memory card is selected.

Next, the user selects a device on the destination side in the menu on the sink device side. When the graphic items 22a–22d, 23a–23f representing the devices 11, 12, 14–16, 31–34 and the digital buses 13, 30 in the abscissa axis direction and in the ordinate axis directions, the user first selects a graphic item among the graphic items 22a–22d representing the devices 11, 12 and the digital buses 13, 30 in the abscissa axis direction on the sink device side. In the present embodiment shown in FIG. 12, the user selects the graphic item 22b ("1394") with the cursor.

Next, when the user selects one of the graphic items 23a–23f displayed in the ordinate axis directions and representing the devices 14–16, 31–33, the user selects a desired device among the graphic items 23a–23c displayed in the ordinate axis direction adjoining the graphic item 22b, the graphic item 23a ("VCR") in the present embodiment shown in FIG. 12, for example, and then the video cassette recorder is selected.

The user thus selects the "CARD" connected with the digital bus 30 conforming to the USB standards on the source device side in the menu 18, and has selected the "VCR" connected with the digital bus 13 conforming to the IEEE standards 1394 on the sink device side in the menu 18. Then, the "CARD" and the "VCR" become connectable to each other as the connectable devices. Consequently, the transmission and the reception of data between the connectable devices can be performed in conformity with not shown operations. Moreover, it is needless to say that the technique can be applied to specify a device to which signals are output and a device from which signals are input.

Next, the attached drawings are referred while a piece of electronic equipment for realizing a selection method of the devices connected with the electronic equipment according to an eleventh embodiment is described.

Figure 23:
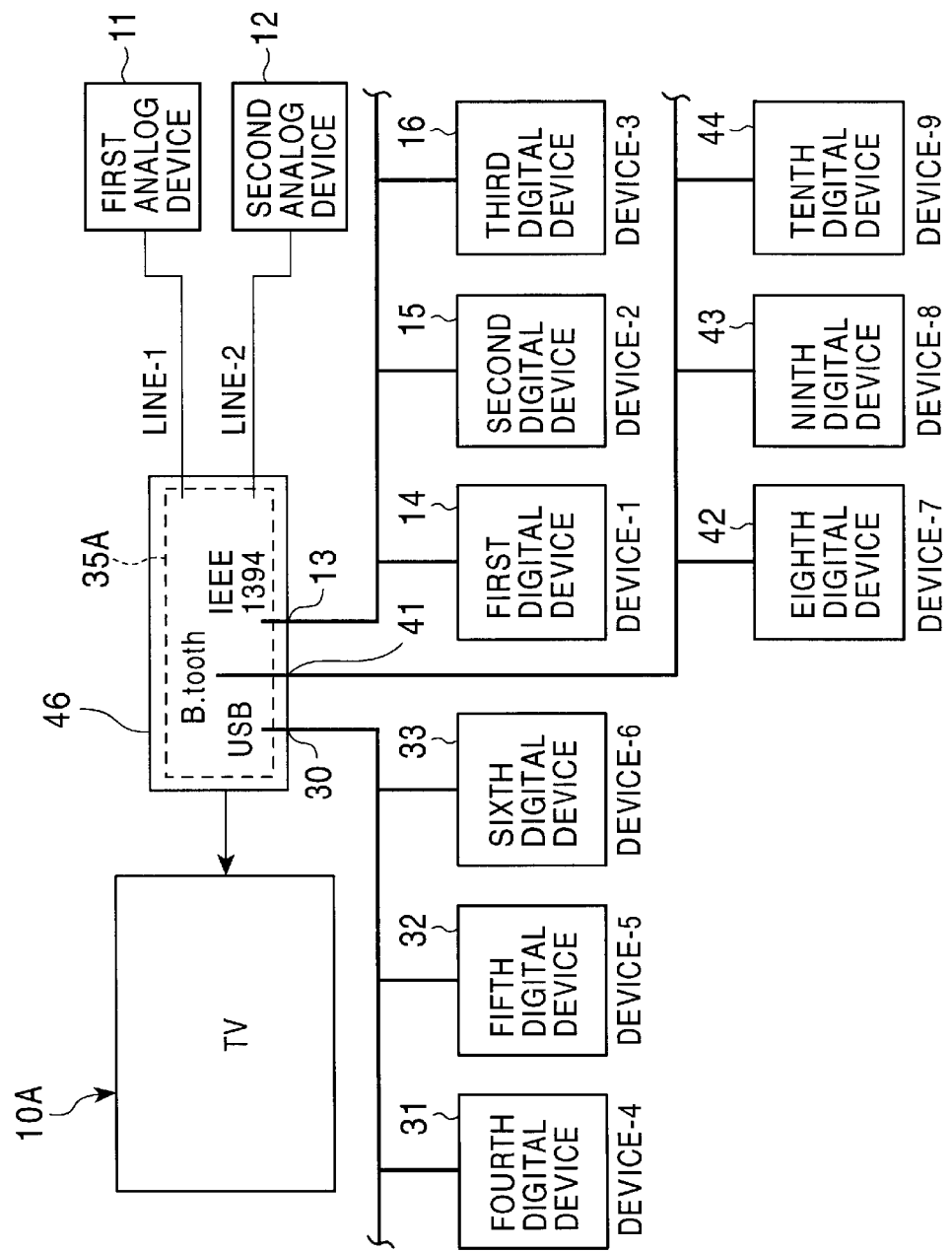
FIG. 23 is a block diagram showing the connection configuration of the electronic equipment realizing the selection method of an eleventh embodiment according to the present invention, in which a television receiver is used as a display and the control of devices is performed by a device controller.

The configuration for realizing the selection method of the devices connected with the electronic equipment of the eleventh embodiment includes a device having a display such as a television receiver and a device controller equipped with a plurality of input/output terminals connectable with a bus of a device having a digital bus and a function of radio transmission. The device controller has a function of selecting devices connected with the electronic equipment and connecting the selected devices with each other. The device controller besides has a function of specifying a device from which signals are input and to which signals are output. The device controller is, for example, a receiver such as an AV selector equipped with an audio tuner, a line selector, a set top box (STB), or the like. The device controller 46 can be connected with the television receiver 10A as shown in FIG. 23. The device controller 46 besides includes an equipment control section 35A for connecting a plurality of input/output terminals with devices.

The plural input/output terminals have a structure so that the input/output terminals can be connected with devices for analog signals and devices for digital signals, both having different protocols, in physically different forms.

A first analog device (VTR, for example) 11 is connected with the input/output terminal Line-1 to be connected with a device for analog signals, and a second analog device (LDP, for example) 12 is connected with the input/output terminal Line-2 to be connected with a device for analog signals.

A first digital device (VCR, for example) 14 is connected with an input/output terminal "1394" to be connected with the digital signal devices connected with a digital bus 13 conforming to the IEEE standards 1394 as a Device-1 in a daisy-chained way, and a second digital device (HDD, for example) 15 is connected with the input/output terminal "1394" as a Device-2 in a daisy-chained way, and further a third digital device (DVD, for example) 16 is connected with the input/output terminal "1394" as a Device-3 in a daisy-chained way.

A fourth digital device (a memory card, for example) 31 is connected with an input/output terminal "USB" to be connected with a digital bus 30 conforming to the Universal Serial Bus (USB) standards as a Device-4, and a fifth digital device (a still camera, for example) 32 is connected with the input/output terminal "USB" as a Device-5, and further a sixth digital device (a scanner, for example) 33 is connected with the input/output terminal "USB" as a Device-6.

An eighth digital device (a printer, for example) 42, as a Device-8, is connected with an input/output terminal "B. tooth" to be connected with a bus 41 connectable with devices having a function of radio transmission. A ninth digital device (a telephone, for example) 43 is connected with the input/output terminal "B. tooth" as a Device-9. A tenth digital device (a digital camera, for example) 44 is connected with the input/output terminal "B. tooth" as a Device-10.

Figure 24:
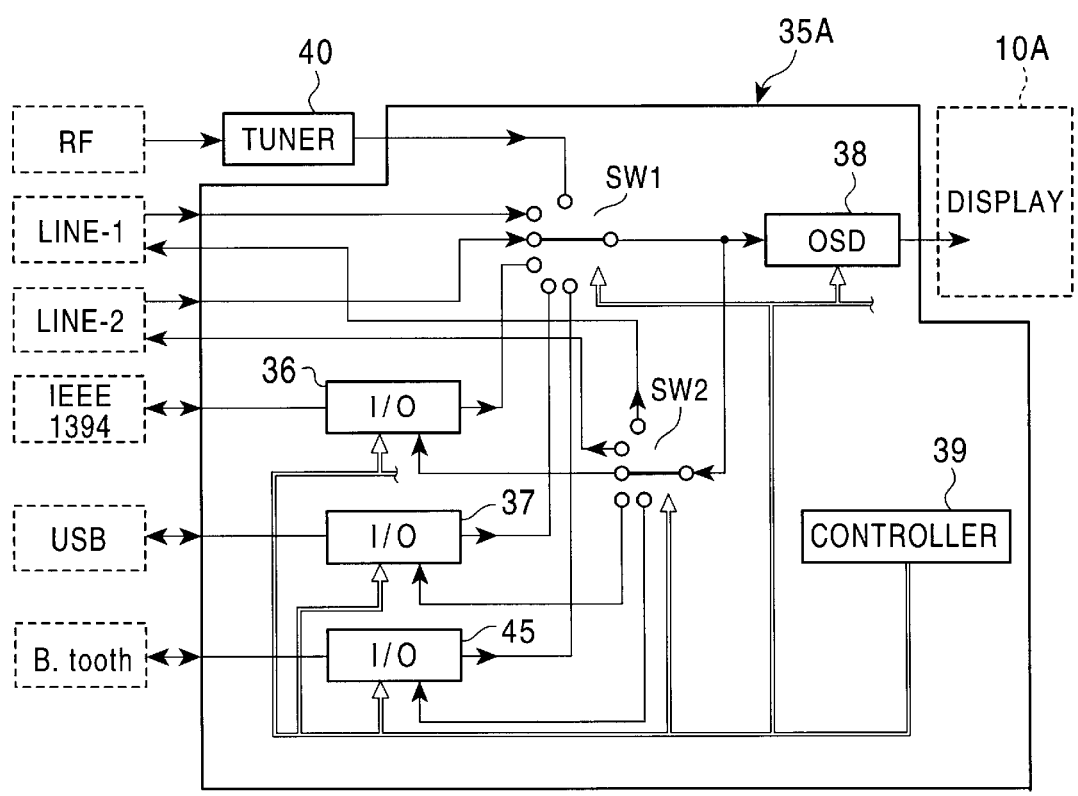
FIG. 24 is a schematic connection diagram showing the equipment control section for connecting the devices shown in FIG. 23.

As shown in FIG. 24, the equipment control section 35A includes an input-switching switch SW1 for switching input side terminals among the plural input/output terminals physically, an output-switching switch SW2 for switching output side terminals among the input/output terminals physically, a first I/O section 36 for switching logically the devices connected with the input/output terminal "1394" conforming to the IEEE standards 1394, a second I/O section 37 for switching the devices connected with the input/output terminal "USB" conforming to the USB standards, a third I/O section 45 for switching logically the devices connected with the input/output terminal "B. tooth" to be connected with a bus connectable with devices having radio transmission, and a controller 39 for controlling these switches SW1, SW2, I/O sections 36, 37, 45 and a superimposition display section (OSD) 38. Incidentally, the input-switching switch SW1 is configured to be connectable with a tuner 40 and the input/output terminals. In this context, the "tuner 40" includes all of the broadcasting receivers that can receive such as Communication Satellite (CS) broadcasting, Broadcasting Satellite (BS) broadcasting, and ground wave broadcasting.

In the thus configured equipment control section 35A, the controller 39 controls the switches SW1, SW2 to connect the physical input/output terminals with devices on the basis of the operation of the user who observes the menu displayed on the display of the television receiver 10A in a superimposed way, and connects devices with each other by connecting input/output terminals corresponding to the devices by means of the logical operations of the I/O sections 36, 37. Or, the switches SW1, SW2 are usable for the selection of the devices for outputting signals. That is, the data from a specific device can be linked with a designated device by the control of the switch SW2 while the switch SW1 is connected with an input/output terminal connected with the specific device.

The menu displayed on the television receiver 10A in a superimposed way (OSD) by the control of the thus configured device controller 46 can be displayed in the same display mode as the menu screen shown in FIG. 17 concerning the eighth embodiment.

To describe it simply, in the case where the devices 11, 12, 14–16, 31–33, 42–44, the digital buses 13, 30 and the bus 41 are displayed as the graphic items 20*a*–20*e*, 21*a*–21*f*, 21*h*–21*j* in the ordinate axis direction and the abscissa axis directions, the user first selects one of the graphic items 20*a*–20*e* (devices 11, 12, digital buses 13, 30, bus 41) displayed in the ordinate axis direction. In the case of the present embodiment shown in FIG. 17, the graphic item 20*e* (B. tooth) indicated by the cursor is selected.

Next, in the case where the user selects one of the devices 14–16, 31–33, 42–44 (graphic items 21*a*–21*f*, 21*h*–21*j* displayed in the abscissa axis directions), the user selects one of the graphic items 21*h*–21*j* representing the devices 42–44 and being displayed in the abscissa axis direction adjoining the graphic item 20*e* as a desired device, the graphic item 21*i* ("PHONE") in the present embodiment shown in FIG. 17, and then the telephone such as a cellular phone is selected.

Such variations of the graphic items 20*a*–20*e*, 21*a*–21*f*, 21*h*–21*j* into the ordinate axis direction and the abscissa axis directions so as to correspond to the connection state of the devices 11, 12, 14–16, 31–33, 42–44, the digital buses 13, 30 and the bus 41 makes it possible to make the discrimination of the connection states of the devices 11, 12, 14–16, 31–33, 42–44 very simply and easily.

Next, an embodiment, in which devices connected with the electronic equipment are connected to each other, is described. The devices to be connected with each other may be selected by means of a menu displayed on the television receiver 10 in a superimposed way (OSD) like FIG. 18 concerning the eighth embodiment.

To describe it simply, in the case where the graphic items 20a–20e, 21a–21f, 21h–21j representing the devices 11, 12, 14–16, 31–33, 42–44, the digital buses 13, 30 and the bus 41 in the ordinate axis direction and the abscissa axis directions in the menus on the source device side and on the sink device side, a user, at first, selects one of the graphic items 20a–20e (devices 11, 12, digital buses 13, 30, bus 41) displayed in the ordinate axis direction on the source device side. In the present embodiment shown in FIG. 18, the user has selected the graphic item 20c (1394) by pointing it with the cursor.

Next, when the user selects one of the graphic items 21a–21f, 21h–21j displayed in the abscissa axis directions representing the devices 14–16, 31–33, 42–44, the user selects a desired device among the graphic items 21a–21c displayed in the abscissa axis direction adjoining the graphic item 20c, e.g. the graphic item 21a ("VCR") in the embodiment, and then the video cassette recorder is selected.

Next, the user selects a device on the destination side in the menu on the sink device side. When the graphic items 20a–20e, 21a–21f, 21h–21j representing the devices 11, 12, 14–16, 31–33, 42–44, the digital buses 13, 30 and the bus 41 are displayed in the ordinate axis direction and the abscissa axis directions, the user first selects a graphic item among the graphic items 20a–20e (devices 11, 12, digital buses 13, 30, bus 41) arranged in the ordinate axis direction on the sink device side. In the present embodiment shown in FIG. 18, the user selects the graphic item 20d ("USB") pointed out by the cursor.

Next, when the user selects one of the graphic items 21a–21f, 21h–21j displayed in the abscissa axis directions and representing the devices 14–16, 31–33, 42–44, the user selects a desired device among the graphic items 21d–21f displayed in the abscissa axis direction adjoining the graphic item 20d, e.g. the graphic item 21e ("Video") in the present embodiment shown in FIG. 20, and then the video recorder is selected.

The user thus selects the "VCR" connected with the digital bus 13 conforming to the IEEE standards 1394 on the source device side in the menu 18, and selects the "Video" connected with the digital bus 30 conforming to the USB standards on the sink device side in the menu 18. Then, the "VCR" and the "Video" become connectable to each other as the connectable devices. Consequently, the transmission and the reception of data between the connectable devices can be performed in conformity with not shown operations.

Next, a description is given to the display of a menu in which physical devices are displayed in an abscissa axis direction and logical devices are displayed in ordinate axis directions for the selection of the devices. The display of the menu can be the same as the display mode shown in FIG. 19 concerning the ninth embodiment.

To put it simple, in the case where the devices 11, 12, 14–16, 31–33, 42–44, the digital buses 13, 30 and the bus 41 are displayed as the graphic items 22a–22e, 23a–23f, 23h–23j in the ordinate axis directions and the abscissa axis direction, a user first selects one of the graphic items 22a–22e (the devices 11, 12, the digital buses 13, 30 and the bus 41) displayed in the abscissa axis direction. In the case of the embodiment shown in FIG. 19, the graphic item 22a (USB) pointed out by the cursor is selected.

Next, in the case where the user selects one of the devices 14–16, 31–33, 42–44 (the graphic items 23a–23f, 23h–23j displayed in the ordinate axis directions), the user selects one of the graphic items 23d–23f representing the devices 31–33 displayed in the ordinate axis adjoining the graphic item 22a as a desired device, the graphic item 23e ("Still") in the present embodiment shown in FIG. 19, and then the still camera can be selected.

Next, an embodiment for connecting the devices connected with the electronic equipment with each other is described. When a user selects the devices to be connected with each other, the user observes the graphic items 22a–22e, 23a–23f, 23h–23j representing the devices 11, 12, 14–16, 31–33, 42–44, the digital buses 13, 30 and the bus 41 in the menu 18 displayed on the screen 17 of the television receiver 10 in a superimposed way as shown in FIG. 20 concerning the ninth embodiment, while the user select one of the graphic items 22a–22e, 23a–23f, 23h–23j as a desired device. In the screen display of the menu 18, a source device menu for the selection of the devices on the source side and a sink device menu for the selection of the devices on the destination side are displayed, and the display modes of both the menus are the same.

To describe it simply, in the case where the graphic items 22a–22e, 23a–23f, 23h–23j representing the devices 11, 12, 14–16, 31–33, 42–44, the digital buses 13, 30 and the bus 41 are displayed in the ordinate axis directions and the abscissa axis direction as the menus of the source devices and the sink devices, a user, at first, selects one of the graphic items 22a–22e (devices 11, 12, digital buses 13, 30, bus 41) displayed in the abscissa axis direction on the source device side. In the present embodiment shown in FIG. 20, the user has selected the graphic item 22b ("1394") by pointing it with the cursor.

Next, when the user selects one of the graphic items 23a–23f, 23h–23j displayed in the ordinate axis directions representing the devices 14–16, 31–33, 42–44, the user selects a desired device among the graphic items 23a–23c displayed in the ordinate axis direction adjoining the graphic item 22b, e.g. the graphic item 23a ("VCR") in the present embodiment shown in FIG. 20, and then the video cassette recorder is selected.

Next, the user selects a device on the destination side in the menu on the sink device side. When the graphic items 22a–22e, 23a–23f, 23h–23j representing the devices 11, 12, 14–16, 31, 42–44, the digital buses 13, 30, and the bus 41 are displayed in the abscissa axis direction and in the ordinate axis directions, the user first selects a graphic item among the graphic items 22a–22e representing the devices 11, 12, the digital buses 13, 30 and the bus 41 in the abscissa axis direction on the sink device side. In the present embodiment shown in FIG. 20, the user selects the graphic item 22a ("USB") pointed out by the cursor.

Next, when the user selects one of the graphic items 23a–23f, 23h–23j displayed in the ordinate axis directions and representing the devices 14–16, 31–33, 42–44, the user selects a desired device among the graphic items 23d–23f displayed in the ordinate axis direction adjoining the graphic item 22a, e.g. the graphic item 23e ("Still") in the present embodiment shown in FIG. 20, and then the still camera is selected.

The user has thus selected the "VCR" connected with the digital bus 13 conforming to the IEEE standards 1394 on the source device side in the menu 18, and has selected the "Still" connected with the digital bus 30 conforming to the USB standards on the sink device side in the menu 18. Then, the "VCR" and the "Still" become connectable to each other as the connectable devices. Consequently, the transmission and the reception of data between the connectable devices can be performed in conformity with not shown operations.

Although the invention has been described in its preferred form with a certain degree of particularity, obviously many changes and variations are possible therein. It is therefore to be understood that the present invention may be practiced than as specifically described herein without departing from scope and the sprit thereof.

What is claimed is:

1. A selection method of devices connected with a piece of electronic equipment, said method comprising the steps of:

displaying a plurality of input/output terminals with which devices having different protocols are connected in physically different forms in an ordinate axis direction;

displaying said devices, which are connected with said input/output terminals and connection states of which can logically be discriminated, in an abscissa axis direction, and performing a selecting step selected from the following:

selecting one of said input/output terminals displayed in the ordinate axis direction to select one of said devices connected with the selected input/output terminal, selecting one of said devices displayed in the abscissa axis direction, and selecting one of said devices displayed in the abscissa axis direction after selecting one of said input/output terminals displayed in the ordinate axis direction.

2. The selection method according to claim 1, wherein said electronic equipment equipped with said input/output terminals is a display apparatus.

3. The selection method according to claim 1, wherein said electronic equipment equipped with said input/output terminals is a device controller having a function of displaying a menu on a screen of a display.

4. The selection method according to claim 1, wherein said input/output terminals include input/output terminals connectable with a device for analog signals and input/output terminals connectable with a device for digital signals, which are disposed to be intermingled.

5. The selection method according to claim 1, wherein said input/output terminals include input/output terminals connectable with a device for analog signals and input/output terminals connectable with a device connected with a digital bus, which are disposed to be intermingled.

6. The selection method according to claim 5, wherein said input/output terminals connectable with said device for analog signals is displayed in said ordinate axis direction and said device connected with said digital bus is displayed in said abscissa axis direction.

7. The selection method according to claim 1, wherein said devices the connection states of which can logically be discriminated are connected with a digital bus.

8. The selection method according to claim 7, wherein said digital bus is selected from the group comprising all or any one or any combination of a bus conforming to the IEEE 1394 standards, a bus conforming to the USB standards, and a bus connectable with a device having a function of radio transmission.

9. The selection method according to claim 1, wherein said input/output terminals and said devices displayed in said ordinate axis direction and in said abscissa axis direction, respectively, are displayed on said electronic equipment in a superimposed way so as to be properly selected.

10. A selection method of devices connected with a piece of electronic equipment, said method comprising the steps of:

displaying a plurality of input/output terminals with which devices having different protocols are connected in physically different forms in an abscissa axis direction;

displaying said devices, which are connected with said input/output terminals and connection states of which can logically be discriminated, in an ordinate axis direction, and performing a selecting step selected from the following:

selecting one of said input/output terminals displayed in the abscissa axis direction to select one of said devices connected with the selected input/output terminal, selecting one of said devices displayed in the ordinate axis direction, and selecting one of said devices displayed in the ordinate axis direction after selecting one of said input/output terminals displayed in the abscissa axis direction.

11. The selection method according to claim 10, wherein said electronic equipment equipped with said input/output terminals is a display apparatus.

12. The selection method according to claim 10, wherein said electronic equipment equipped with said input/output terminals is a device controller having a function of displaying a menu on a screen of a display.

13. The selection method according to claim 10, wherein said input/output terminals include input/output terminals connectable with a device for analog signals and input/output terminals connectable with a device for digital signals, which are disposed to be intermingled.

14. The selection method according to claim 10, wherein said input/output terminals include input/output terminals connectable with a device for analog signals and input/output terminals connectable with a device connected with a digital bus, which are disposed to be intermingled.

15. The selection method according to claim 14, wherein said input/output terminals connectable with said device for analog signals is displayed in said abscissa axis direction and said device connected with said digital bus is displayed in said ordinate axis direction.

16. The selection method according to claim 10, wherein said devices the connection states of which can logically be discriminated are connected with a digital bus.

17. The selection method according to claim 16, wherein said digital bus is selected from the group comprising all or any one or any combination of a bus conforming to the IEEE 1394 standards, a bus conforming to the USB standards, and a bus connectable with a device having a function of radio transmission.

18. The selection method according to claim 10, wherein said input/output terminals and said devices displayed in said abscissa axis direction and in said ordinate axis direction, respectively, are displayed on said electronic equipment in a superimposed way so as to be properly selected.

19. Electronic equipment, comprising:

ordinate axis direction display means for displaying a plurality of input/output terminals with which devices having different protocols are connected in physically different forms in an ordinate axis direction;

abscissa axis direction display means for displaying said devices, which are connected with said input/output terminals and connection states of which can logically be discriminated, in an abscissa axis direction;

ordinate axis direction selection means for selecting one of said input/output terminals displayed in the ordinate axis direction by said ordinate axis direction display means to select one of said devices connected with the selected input/output terminal, and abscissa axis direction selection means for selecting one of said devices displayed in the abscissa axis direction by said abscissa axis direction display means.

20. The electronic equipment according to claim 19, wherein said ordinate axis direction selection means and said abscissa axis direction selection means select one of said devices displayed in the abscissa axis direction after selecting one of said input/output terminals displayed in the ordinate axis direction.

21. The electronic equipment according to claim 19, wherein said electronic equipment equipped with said input/output terminals is a display apparatus.

22. The electronic equipment according to claim 19, wherein said electronic equipment equipped with said input/output terminals is a device controller having a function of displaying a menu on a screen of a display.

23. The electronic equipment according to claim 19, wherein said input/output terminals include input/output terminals connectable with a device for analog signals and input/output terminals connectable with a device for digital signals, which are disposed to be intermingled.

24. The electronic equipment according to claim 19, wherein said input/output terminals include input/output terminals connectable with a device for analog signals and input/output terminals connectable with a device connected with a digital bus, which are disposed to be intermingled.

25. The electronic equipment according to claim 24, wherein said input/output terminals connectable with said device for analog signals is displayed in said ordinate axis direction and said device connected with said digital bus is displayed in said abscissa axis direction.

26. The electronic equipment according to claim 19, wherein said devices the connection states of which can logically be discriminated are connected with a digital bus.

27. The electronic equipment according to claim 26, wherein said digital bus is selected from the group comprising all or any one or any combination of a bus conforming to the IEEE 1394 standards, a bus conforming to the USB standards, and a bus connectable with a device having a function of radio transmission.

28. The electronic equipment according to claim 19, wherein said input/output terminals and said devices displayed in said ordinate axis direction and in said abscissa axis direction, respectively, are displayed on said electronic equipment in a superimposed way so as to be properly selected.

29. Electronic equipment comprising:

abscissa axis direction display means for displaying a plurality of input/output terminals with which devices having different protocols are connected in physically different forms in an abscissa axis direction;

ordinate axis direction display means for displaying said devices, which are connected with said input/output terminals and connection states of which can logically be discriminated, in an ordinate axis direction;

abscissa axis direction selection means for selecting one of said input/output terminals displayed in the abscissa axis direction to select one of said devices connected with the selected input/output terminal, and ordinate axis direction selection means for selecting one of said devices displayed in the ordinate axis direction.

30. The electronic equipment according to claim 29, wherein said ordinate axis direction selection means and said abscissa axis direction selection means select one of said devices displayed in the ordinate axis direction after selecting one of said input/output terminals displayed in the abscissa axis direction.

31. The electronic equipment according to claim 29, wherein said electronic equipment equipped with said input/output terminals is a display apparatus.

32. The electronic equipment according to claim 29, wherein said electronic equipment equipped with said input/output terminals is a device controller having a function of displaying a menu on a screen of a display.

33. The electronic equipment according to claim 29, wherein said input/output terminals include input/output terminals connectable with a device for analog signals and input/output terminals connectable with a device for digital signals, which are disposed to be intermingled.

34. The electronic equipment according to claim 29, wherein said input/output terminals include input/output terminals connectable with a device for analog signals and input/output terminals connectable with a device connected with a digital bus, which are disposed to be intermingled.

35. The electronic equipment according to claim 34, wherein said one of said input/output terminals connectable with said device for analog signals is displayed in said abscissa axis direction and said device connected with said digital bus is displayed in said ordinate axis direction.

36. The electronic equipment according to claim 29, wherein said devices the connection states of which can logically be discriminated are connected with a digital bus.

37. The electronic equipment according to claim 36, wherein said digital bus is selected from the group comprising all or any one or any combination of a bus conforming to the IEEE 1394 standards, a bus conforming to the USB standards, and a bus connectable with a device having a function of radio transmission.

38. The electronic method according to claim 29, wherein said input/output terminals and said devices displayed in said abscissa axis direction and in said ordinate axis direction, respectively, are displayed on said electronic equipment in a superimposed way so as to be properly selected.

39. Electronic equipment including input/output terminals, with which devices having different protocols can be connected in physically different forms, said electronic equipment being capable of displaying some of said devices connected with said input/output terminals by discriminating said some of devices logically, wherein:

said electronic equipment displays said devices connected with said input/output terminals in an ordinate axis direction and said some of said devices that can be displayed by being logically discriminated in an abscissa axis direction, or said electronic equipment displays both of them in exchanged directions, and further said electronic equipment selects one of said devices displayed in the ordinate axis direction and the abscissa axis direction to specify a device to which signals are output and/or connects arbitrary two devices among said devices with each other.

40. The electronic equipment according to claim 39, wherein said electronic equipment equipped with said input/output terminals is a display apparatus.

41. The electronic equipment according to claim 39, wherein said electronic equipment equipped with said input/output terminals is a device controller having a function of displaying a menu on a screen of a display.

42. The electronic equipment according to claim 39, wherein said input/output terminals include input/output terminals connectable with a device for analog signals and input/output terminals connectable with a device for digital signals, which are disposed to be intermingled.

43. The electronic equipment according to claim 39, wherein said input/output terminals include input/output terminals connectable with a device for analog signals and input/output terminals connectable with a device connected with a digital bus, which are disposed to be intermingled.

44. The electronic equipment according to claim 39, wherein said some of said devices that can logically be discriminated are connected with a digital bus.

45. The electronic equipment according to claim 44, wherein said digital bus is selected from the group comprising all or any one or any combination of a bus conforming to the IEEE 1394 standards, a bus conforming to the USB standards, and a bus connectable with a device having a function of radio transmission.

46. The electronic equipment according to claim 39, wherein said devices displayed in said ordinate axis direction and said abscissa axis direction are displayed in a superimposed way.

47. Electronic equipment including input terminals, with which devices having different protocols can be connected in physically different forms, said electronic equipment being capable of displaying some of said devices connected with said input terminals by discriminating said some of devices logically, wherein:

said electronic equipment displays said devices connected with said input terminals in an ordinate axis direction and said some of said devices that can be displayed by being logically discriminated in an abscissa axis direction, or said electronic equipment displays both of them in exchanged directions, and further said electronic equipment selects one of said devices displayed in the ordinate axis direction and the abscissa axis direction to specify a device from which signals are input.

48. The electronic equipment according to claim 47, wherein said electronic equipment equipped with said input terminals is a display apparatus.

49. The electronic equipment according to claim 47, wherein said electronic equipment equipped with said input terminals is a device controller having a function of displaying a menu on a screen of a display.

50. The electronic equipment according to claim 47, wherein said input terminals include input terminals connectable with a device for analog signals and input terminals connectable with a device for digital signals, which are disposed to be intermingled.

51. The electronic equipment according to claim 47, wherein said input terminals include input terminals connectable with a device for analog signals and input terminals connectable with a device connected with a digital bus, which are disposed to be intermingled.

52. The electronic equipment according to claim 47, wherein said some of said devices that can logically be discriminated are connected with a digital bus.

53. The electronic equipment according to claim 52, wherein said digital bus is selected from the group comprising all or any one or any combination of a bus conforming to the IEEE 1394 standards, a bus conforming to the USB standards, and a bus connectable with a device having a function of radio transmission.

54. The electronic equipment according to claim 47, wherein said devices displayed in said ordinate axis direction and said abscissa axis direction are displayed in a superimposed way.

* * * * *

UNITED STATES PATENT AND TRADEMARK OFFICE
CERTIFICATE OF CORRECTION

PATENT NO. : 6,825,858 B2
DATED : November 30, 2004
INVENTOR(S) : Masahiko Sato

It is certified that error appears in the above-identified patent and that said Letters Patent is hereby corrected as shown below:

Column 5,
Line 29, change "21carranged" to -- 21c arranged --.

Column 8,
Line 10, change "21ccorresponding" to -- 21c corresponding --.

Column 18,
Line 62, change "21e)" to -- (21e) --.

Column 29,
Line 26, change "21cdisplayed" to -- 21c displayed --.

Signed and Sealed this

Seventh Day of June, 2005

JON W. DUDAS
*Director of the United States Patent and Trademark Office*